(12) United States Patent
Watanabe et al.

(10) Patent No.: US 6,868,243 B2
(45) Date of Patent: Mar. 15, 2005

(54) IMAGE FORMING APPARATUS HAVING PROCESS CARTRIDGE WITH CONNECTION ARRANGEMENT FOR SIDE FRAME BODIES

(75) Inventors: Kazushi Watanabe, Shizuoka (JP); Akira Suzuki, Kanagawa (JP); Toru Oguma, Shizuoka (JP); Akiyoshi Yokoi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/314,312

(22) Filed: Dec. 9, 2002

(65) Prior Publication Data

US 2003/0113131 A1 Jun. 19, 2003

(30) Foreign Application Priority Data

Dec. 13, 2001 (JP) .................................... 2001-379492
Dec. 13, 2001 (JP) .................................... 2001-379494
Mar. 15, 2002 (JP) .................................... 2002-071237

(51) Int. Cl.$^7$ ............................................ G00G 21/18
(52) U.S. Cl. ..................................................... 399/113
(58) Field of Search ................................ 399/109, 111, 399/113; 264/261, 263

(56) References Cited

U.S. PATENT DOCUMENTS

| 5,294,960 A | 3/1994 | Nomura et al. ............ 355/210 |
| 5,331,372 A | 7/1994 | Tsuda et al. ............... 355/200 |
| 5,470,635 A | 11/1995 | Shirai et al. ............... 428/131 |
| 5,475,470 A | 12/1995 | Sasago et al. ............. 355/210 |
| 5,510,878 A | 4/1996 | Noda et al. ................ 355/211 |
| 5,602,623 A | 2/1997 | Nishibata et al. .......... 399/111 |
| 5,608,509 A | 3/1997 | Shirai et al. ............... 399/351 |
| 5,623,328 A | 4/1997 | Tsuda et al. ............... 399/111 |
| 5,659,847 A | 8/1997 | Tsuda et al. ............... 399/113 |
| 5,669,042 A | 9/1997 | Kobayashi et al. ........ 399/111 |
| 5,828,928 A | 10/1998 | Sasago et al. ............. 399/111 |
| 5,884,124 A | 3/1999 | Karakama et al. ......... 399/123 |
| 5,966,568 A | 10/1999 | Numagami et al. ........ 399/111 |
| 6,070,028 A | 5/2000 | Odagawa et al. .......... 399/104 |
| 6,118,960 A | 9/2000 | Nakagawa et al. ........ 399/111 |
| 6,163,665 A | 12/2000 | Watanabe et al. .......... 399/111 |
| 6,173,145 B1 | 1/2001 | Chadani et al. ............ 399/265 |
| 6,236,821 B1 | 5/2001 | Yokoyama et al. ........ 399/113 |
| 6,336,018 B1 | 1/2002 | Kawai et al. ............... 399/117 |
| 6,415,121 B1 | 7/2002 | Suzuki et al. .............. 399/111 |
| 6,481,081 B1 * | 11/2002 | Kilian et al. ............ 29/407.01 |
| 6,519,431 B1 * | 2/2003 | Toba et al. ................. 399/111 |
| 6,542,706 B2 * | 4/2003 | Toba et al. ................. 399/111 |
| 6,603,939 B1 * | 8/2003 | Toba et al. ................. 399/103 |
| 6,654,578 B2 * | 11/2003 | Suzuki et al. .............. 399/111 |
| 2002/0037179 A1 | 3/2002 | Suzuki et al. .............. 399/111 |
| 2002/0067930 A1 | 6/2002 | Oguma et al. ............. 399/222 |
| 2002/0122674 A1 | 9/2002 | Yokoi et al. ................ 399/113 |
| 2002/0131791 A1 | 9/2002 | Yokoi et al. ................ 399/113 |
| 2002/0159787 A1 | 10/2002 | Chadani et al. ............ 399/109 |
| 2002/0159788 A1 | 10/2002 | Miyabe et al. ............. 399/109 |

FOREIGN PATENT DOCUMENTS

| JP | 2000075621 A | * | 3/2000 | .......... G03G/15/08 |
| JP | 2001030297 A | * | 2/2001 | .......... B29C/45/16 |

* cited by examiner

*Primary Examiner*—Robert Beatty
(74) *Attorney, Agent, or Firm*—Fitzpatrick, Cella, Harper & Scinto

(57) ABSTRACT

The process cartridge includes an electrophotographic photosensitive drum, a first unit frame body supporting the drum, a second unit frame body having a developing device and a developer containing portion, a first connection frame body for connecting one end of the first and second unit frame bodies with respect to the axial direction of the drum, a second connection frame body for connecting the other end of the first and second unit frame bodies with respect to the axial direction, first, second, and third fixation devices for fixing the first and second connection frame bodies to the first and second unit frame bodies through abutment, and a fourth fixation device for fixing the second connection frame body and the second unit frame body to each other by filling a gap between the second connection frame body and the second unit frame body.

22 Claims, 30 Drawing Sheets

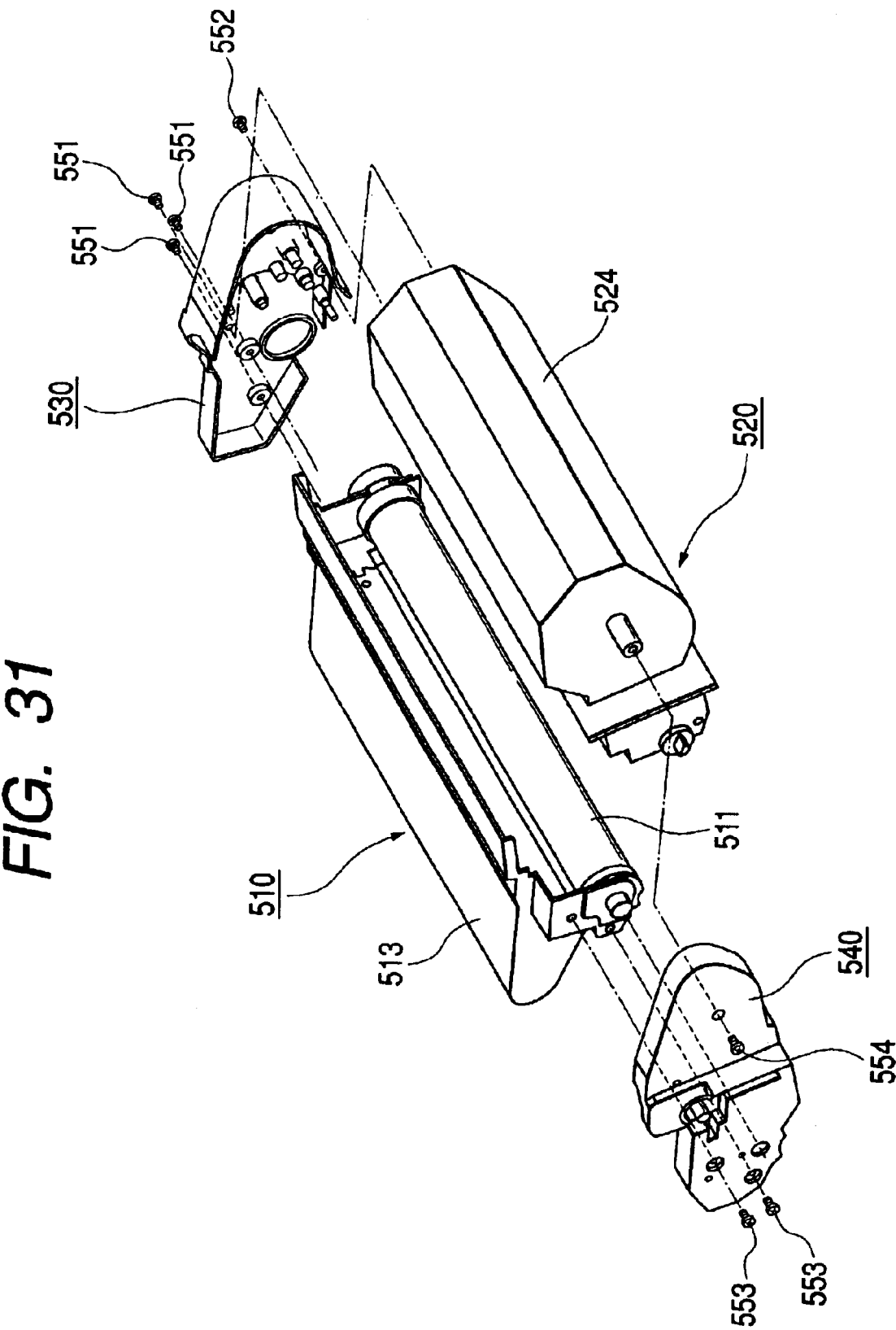

IMAGE FORMING APPARATUS HAVING PROCESS CARTRIDGE WITH CONNECTION ARRANGEMENT FOR SIDE FRAME BODIES

BACKGROUND OF THE INVENTION

1. Field of the Invention

The present invention relates to a process cartridge for use in an image forming apparatus using an electrophotography method, such as a laser printer or a copying machine, and to an electrophotographic image forming apparatus.

2. Related Background Art

An electrophotographic image forming apparatus forms an image on a recording medium by using electrophotography. Examples of an electrophotographic image forming apparatus include an electrophotographic copying machine, an electrophotographic printer (laser beam printer, LED printer and the like), a facsimile machine, and a word processor.

Generally speaking, a process cartridge is obtained by integrating a charging means, a developing means, or a cleaning means as a process means with an electrophotographic photosensitive member to form a cartridge which is detachable with respect to an image forming apparatus main body. Apart from this, a process cartridge is obtained by integrating at least one of a charging means, a developing means, and a cleaning means as process means with an electrophotographic photosensitive member to form a cartridge which is detachable with respect to an image forming apparatus main body, or by integrating at least a developing means as a process means with an electrophotographic photosensitive member to form a cartridge which is detachable with respect to an image forming apparatus main body.

A drum unit is a unit including a photosensitive drum which is an electrophotographic photosensitive member in a process cartridge which is detachable with respect to an electrophotographic image forming apparatus main body.

Conventionally, an image forming apparatus using the electrophotographic-image-forming process adopts a process-cartridge system, in which an electrophotographic photosensitive member and a process device described above are integrated into a cartridge which is detachable with respect to an image forming apparatus main body. In the process-cartridge system, the maintenance of the apparatus can be performed by the user without depending on a serviceman, thereby achieving a marked improvement in operability. Thus, the process-cartridge system is widely applied to image forming apparatuses.

By adopting the process-cartridge system, the user can easily perform maintenance and replacement whenever the process device needs maintenance, making it possible to obtain a high quality image at a low cost and with ease.

FIGS. 30 and 31 show a conventional electrophotographic image forming apparatus using the process-cartridge system. This process cartridge 502 is composed of two units: a drum unit 510 including a drum-frame body 513 integrally supporting a photosensitive drum 511, a charging roller 507, a cleaning blade 512a, etc., and a developing unit 520 including a developing-frame body 523 integrally supporting a developing roller 521 and a developing blade 522 and a toner container (container-frame body) 524 containing toner serving as the developer.

To integrally join the two units, side covers 530 and 540 are fixed to the side surfaces of the units by means of screws 551 through 554 to form integrally a cartridge.

The above-described process cartridge has the following problems:

First, due to the construction in which the drum-frame body, the toner container, etc. are held between the side covers and fastened by screws, the requisite number of screws for fixing the side covers is rather large, resulting in an increase in assembly man-hours.

Further, due to a variation in the longitudinal dimensions of the frame bodies of the two units of the process cartridge, there is the possibility of the drum unit and the developing unit being connected in parallel and obliquely.

SUMMARY OF THE INVENTION

The present invention has been made in view of the above-described problems.

An object of the present invention is to provide a process cartridge capable of achieving an improvement in ease of assembly and an electrophotographic image forming apparatus to which the process cartridge is to be attached.

More specifically, another object of the present invention is to provide a process cartridge which allows accurate and reliable assembly of a first unit-frame body supporting an electrophotographic photosensitive drum and a second unit-frame body having a developing means for developing an electrostatic latent image formed on the electrophotographic photosensitive drum with a developer and a developer-containing portion containing the developer, and an electrophotographic image forming apparatus to which the process cartridge is to be attached.

More specifically, another object of the present invention is to provide a process cartridge which allows an improvement in terms of ease of assembly of a first unit-frame body supporting an electrophotographic photosensitive drum and a second unit-frame body having a developing means for developing an electrostatic latent image formed on the electrophotographic photosensitive drum with a developer and a developer-containing portion containing the developer, and an electrophotographic image forming apparatus to which the process cartridge is to be attached.

More specifically, a further object of the present invention is to provide a process cartridge which allows assembly without causing distortion or inclination of a first unit-frame body supporting an electrophotographic photosensitive drum and a second unit-frame body having a developing means for developing an electrostatic latent image formed on the electrophotographic photosensitive drum with a developer and a developer-containing portion containing the developer, and an electrophotographic image forming apparatus to which the process cartridge is to be attached.

Another object of the present invention to provide a process cartridge and an electrophotographic image forming apparatus in which the process cartridge is mounted, the process cartridge being detachable with respect to an electrophotographic image forming apparatus main body, comprising:

an electrophotographic photosensitive drum;

a first unit-frame body supporting the electrophotographic photosensitive drum;

a second unit-frame body having a developing means for developing an electrostatic latent image formed on the electrophotographic photosensitive drum with a developer and a developer-containing portion for containing the developer;

a first connection-frame body for connecting the first unit-frame body and the second unit-frame body at one end of the first unit-frame body and the second unit-frame body with respect to the axial direction of the electrophotographic photosensitive drum;

a second connection-frame body for connecting the first unit-frame body and the second unit-frame body at the other ends of the first unit-frame body and the second unit-frame body with respect to the axial direction of the electrophotographic photosensitive drum;

a first fixation means for fixing the first connection-frame body to the first unit-frame body through abutment;

a second fixation means for fixing the first connection-frame body to the second unit-frame body through abutment;

a third fixation means for fixing the second connection-frame body to the first unit-frame body through abutment; and a fourth fixation means for fixing the second connection-frame body and the second unit-frame body to each other by filling a gap between the second connection-frame body and the second unit-frame body.

BRIEF DESCRIPTION OF THE DRAWINGS

FIG. 31 is an exploded perspective view of the process cartridge of FIG. 30.

DESCRIPTION OF THE PREFERRED EMBODIMENTS

Embodiments of the present invention will now be described with reference to the drawings.

<First Embodiment>

Figure 1:
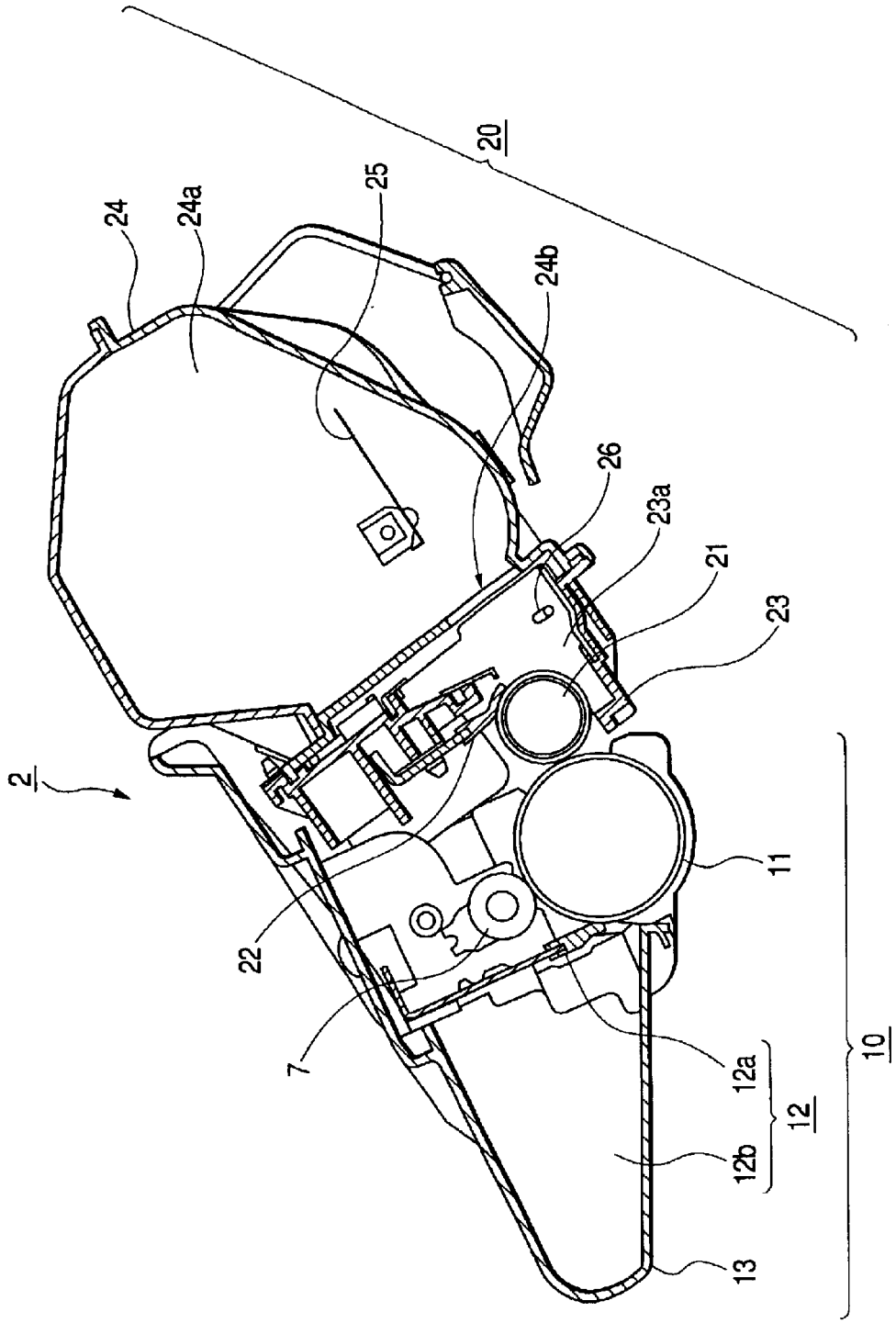
FIG. 1 is a sectional view showing the inner construction of a process cartridge according to a first embodiment of the present invention.
Figure 2:
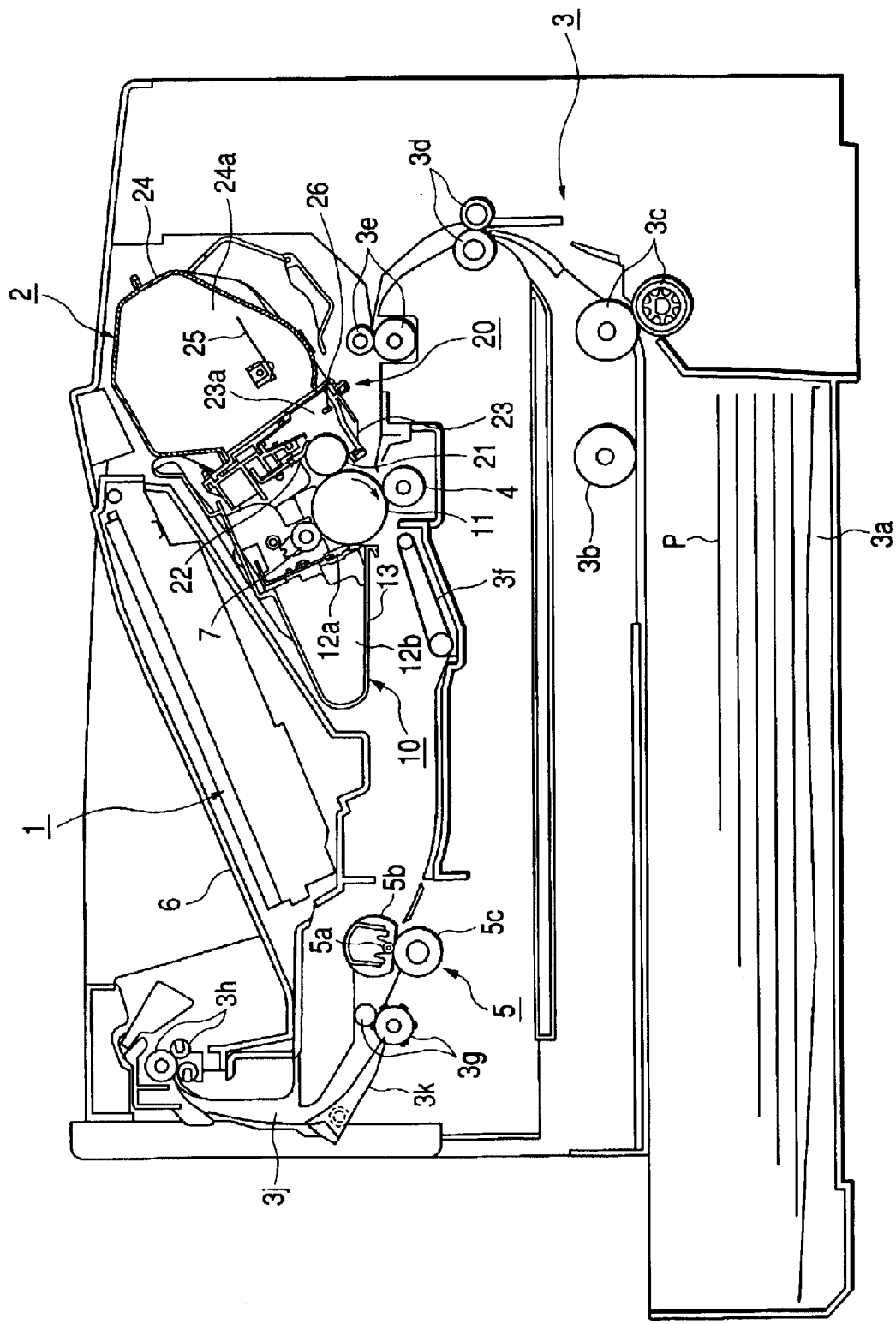
FIG. 2 is an overall explanatory diagram showing an electrophotgraphic image forming apparatus.

FIGS. 1 through 9 show the first embodiment. FIG. 1 only shows a process cartridge, and FIG. 2 shows an entire electrophotographic image forming apparatus in the condition that the process cartridge is mounted. First, as shown in FIG. 2, the electrophotographic image forming apparatus has an optical means 1 including a laser diode, a polygon mirror, a lens, and a reflection mirror, a process cartridge 2 having a photosensitive drum 11, etc., an attachment means (not shown) for detachably attaching the process cartridge to the electrophotographic image forming apparatus main body, a sheet-feeding system 3, which is a transport means for transporting a recording medium P, etc. By applying a laser beam in accordance with image information from the optical means 1, a latent image according to the image information is formed on the photosensitive drum 11 for electrophotography. This latent image is developed by a developing means described below and turned into a visible image, that is, a toner image.

The photosensitive drum 11 constitutes a drum unit 10 together with a cleaning means 12 described below and a drum-frame body 13 which is a first unit-frame body.

The developing means is equipped with a developing roller 21, which is a developer-bearing member for supplying toner onto the photosensitive drum 11, and a developing blade 22, which is a regulating member for regulating the amount of toner, i.e., developer, adhering to the surface of the developing roller 21. The developing roller 21 and the developing blade 22 and a developing-frame body 23 holding them are joined to a toner container 24 containing toner to form a developing unit 20. The developing-frame body 23 forms a second unit-frame body together with the toner container 24 which is a container-frame body.

The developing-frame body 23 has a developing chamber 23a, and toner in the toner container 24 adjacent to the developing chamber 23a is supplied onto the developing roller 21 from the developing chamber 23a through rotation of a toner-feeding member 25. The developing-frame body 23 has, in the vicinity of the developing roller 21, a rotatable toner-agitating member 26, by means of which the toner in the developing chamber 23a supplied from the toner container 24 is circulated. The toner exhibits magnetic properties. Since the developing roller 21 contains a stationary magnet, toner adheres to the developing roller 21.

By rotating the developing roller 21, the toner is fed, and a frictional-eletrification charge is imparted thereto by the developing blade 22. A toner layer of a predetermined thickness is formed on the developing roller 21, and is fed toward the developing area of the photosensitive drum 11. The toner supplied to the developing area is transferred to the latent image on the photosensitive drum 11 to form a toner image on the photosensitive drum 11. The developing roller 21 is connected to a developing-bias circuit provided in the electrophotographic image forming apparatus main body, and a developing-bias voltage, consisting of AC voltage and DC voltage combined through superimposition is normally applied thereto.

The sheet-feeding system 3 shown in FIG. 2 conveys the recording medium P set in a sheet-feeding cassette 3a to a transferring position in synchronism with the formation of the toner image by means of a pickup roller 3b and transport-roller pairs 3c through 3e. A transferring roller 4 serving as a transferring means is arranged at the transferring position. By applying voltage thereto, the toner image on the photosensitive drum 11 is transferred to the image-recording medium.

The recording medium P to which the toner image has been transferred is transported to a fixing means 5 by a transport guide 3f. The fixing means 5 is equipped with a driving roller 5c and a fixing roller 5b containing a heater 5a, and heat and pressure are applied to the passing recording medium P to thereby fix the transferred toner image to the recording medium P.

The recording medium P is transported by discharge-roller pairs 3g and 3h and discharged onto a discharge tray 6 by way of a reverse route 3j. The discharge tray 6 is provided on the upper surface of the electrophotographic image forming apparatus. By operating a swingable flapper 3k, it is also possible to discharge the recording medium P without causing it to travel through the reverse route 3j. In this way, a transport path is formed by the sheet-feeding system 3 including the pickup roller 3b, the transport-roller pairs 3c, 3d, and 3e, the transport guide 3f, and the discharge-roller pairs 3g and 3h.

After the toner image has been transferred to the recording medium P by the transferring roller 4, residual toner on the photosensitive drum 11 is removed by the cleaning means 12. Then, the photosensitive drum is brought into contact with a charging roller 7 to charge the drum surface for the next image-formation process. In the cleaning means 12, an elastic cleaning blade 12a abutting the photosensitive drum 11 scrapes off the residual toner on the photosensitive drum 11, and the waste toner is collected in a waste-toner reservoir 12b.

The developing-frame body 23 of the process cartridge 2 supporting the developing roller 21 is welded to the toner container 24 serving as the developer container to form the integral developing unit (developing device) 20. The toner container 24 has a toner-containing portion 24a serving as the developer-containing portion for containing toner, and a toner-supply opening 24b for supplying toner in the toner-containing portion 24a to the developing chamber 23a, and rotatably supports the toner-feeding member 25 in the toner-containing portion 24a. The toner-supply opening 24b is kept sealed by a developer seal (not shown) until the process cartridge 2 is used. When the process cartridge 2 is used for the first time, the developer seal is removed by the user, whereby toner supply becomes possible. The developing-frame body 23 supports the developing roller 21 and the developing blade 22 constituting the developing means together with the toner container 24.

The cleaning means 12 having the cleaning blade 12a, etc., is supported by the drum-frame body 13 together with the photosensitive drum 11 and the charging roller 7 to form a drum unit 10.

The process cartridge 2 is formed through integration of the developing unit 20 and the drum unit 10 by a connecting method described below.

Figure 3:
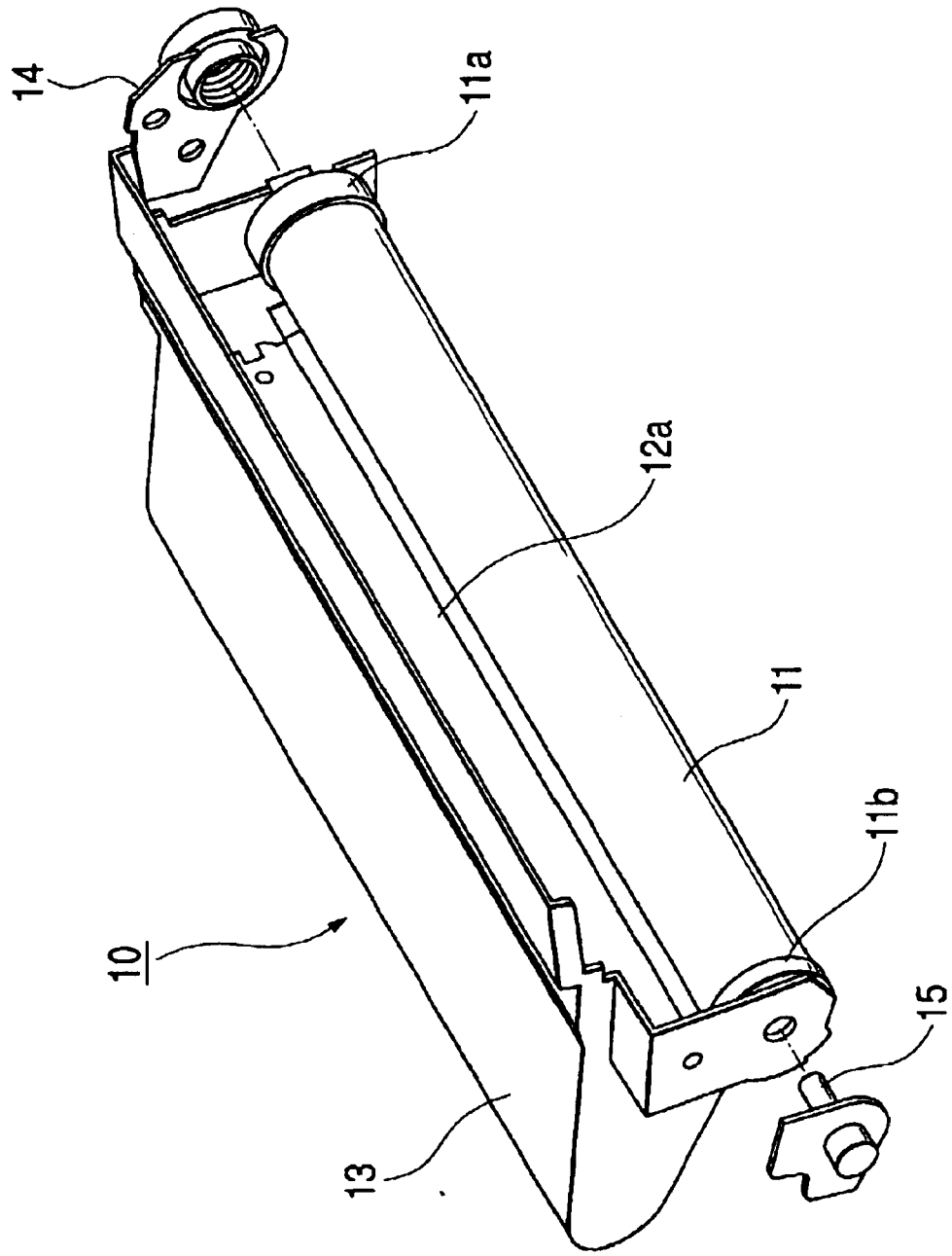
FIG. 3 is a perspective view of a drum unit.

FIG. 3 is a perspective view showing how the photosensitive drum 11 is mounted to the drum-frame body 13. Gear flanges 11a and 11b are mounted to the both ends of the photosensitive drum 11. The gear flange 11a is rotatably supported by a drum bearing 14, and the gear flange 11b is rotatably supported by a drum shaft 15. The drum bearing 14 and the drum shaft 15 are supported by the drum-frame body 13 to form the drum unit 10.

Next, the method of connecting the drum unit 10 and the developing unit 20 to each other will be described.

Figure 4:
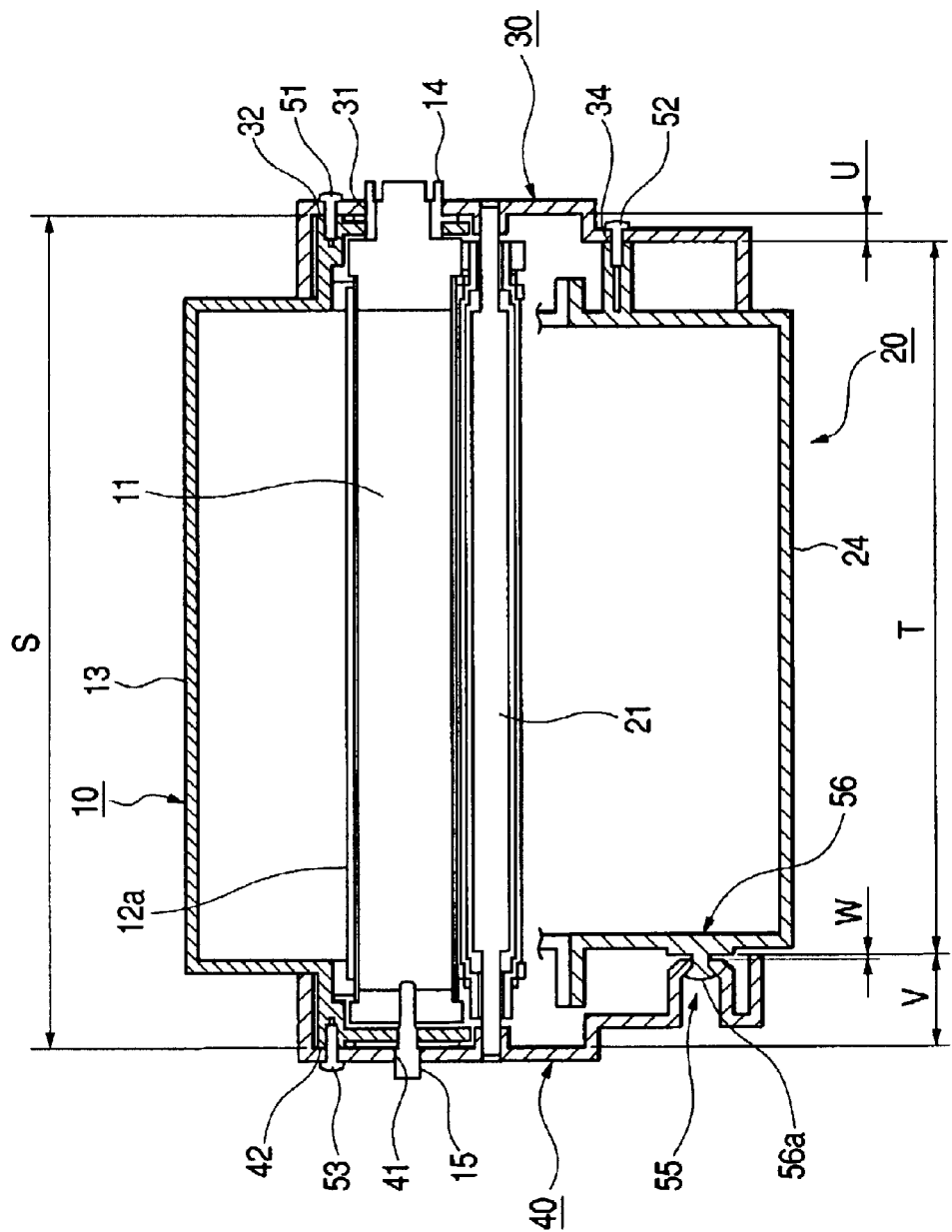
FIG. 4 is a schematic sectional view of the process cartridge of FIG. 1.

FIG. 4 is a figure showing how the drum unit 10 and the developing unit 20 are connected to each other. The drum-frame body 13, which is a unit-frame body supporting the drum unit 10, and the toner container 24 constituting a unit-frame body on the developing-unit side together with the developing-frame body 23, are connected to side covers 30 and 40, which are a first connection-frame body and a second connection-frame body arranged on each side, whereby they are fixed to each other. Positioning of the side cover 30, which is the first connection-frame body, with respect to the drum unit 10 is effected by fitting a cylindrical portion of the drum bearing 14 into a reference hole 31, whereby the position of the photosensitive drum 11 in the direction perpendicular to the longitudinal direction is determined. Further, fastening is effected by a screw 51, with a screw-hole end surface of the drum-frame body 13 abutting a screw-hole seat surface 32 of the side cover 30, whereby the positioning in the longitudinal direction is effected for fixation (first fixation means).

Figure 7:
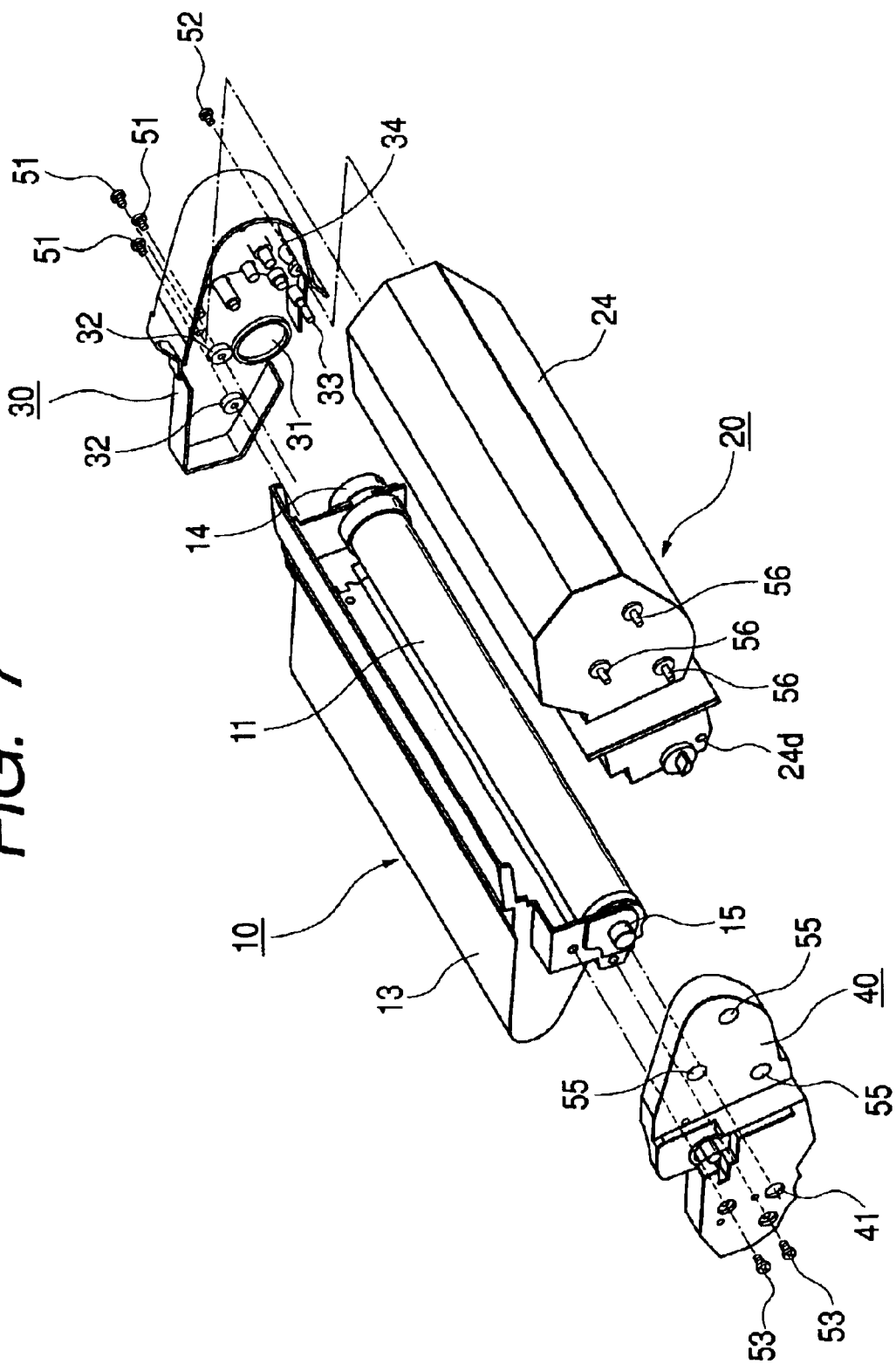
FIG. 7 is an exploded perspective view of the process cartridge of FIG. 4.
Figure 8:
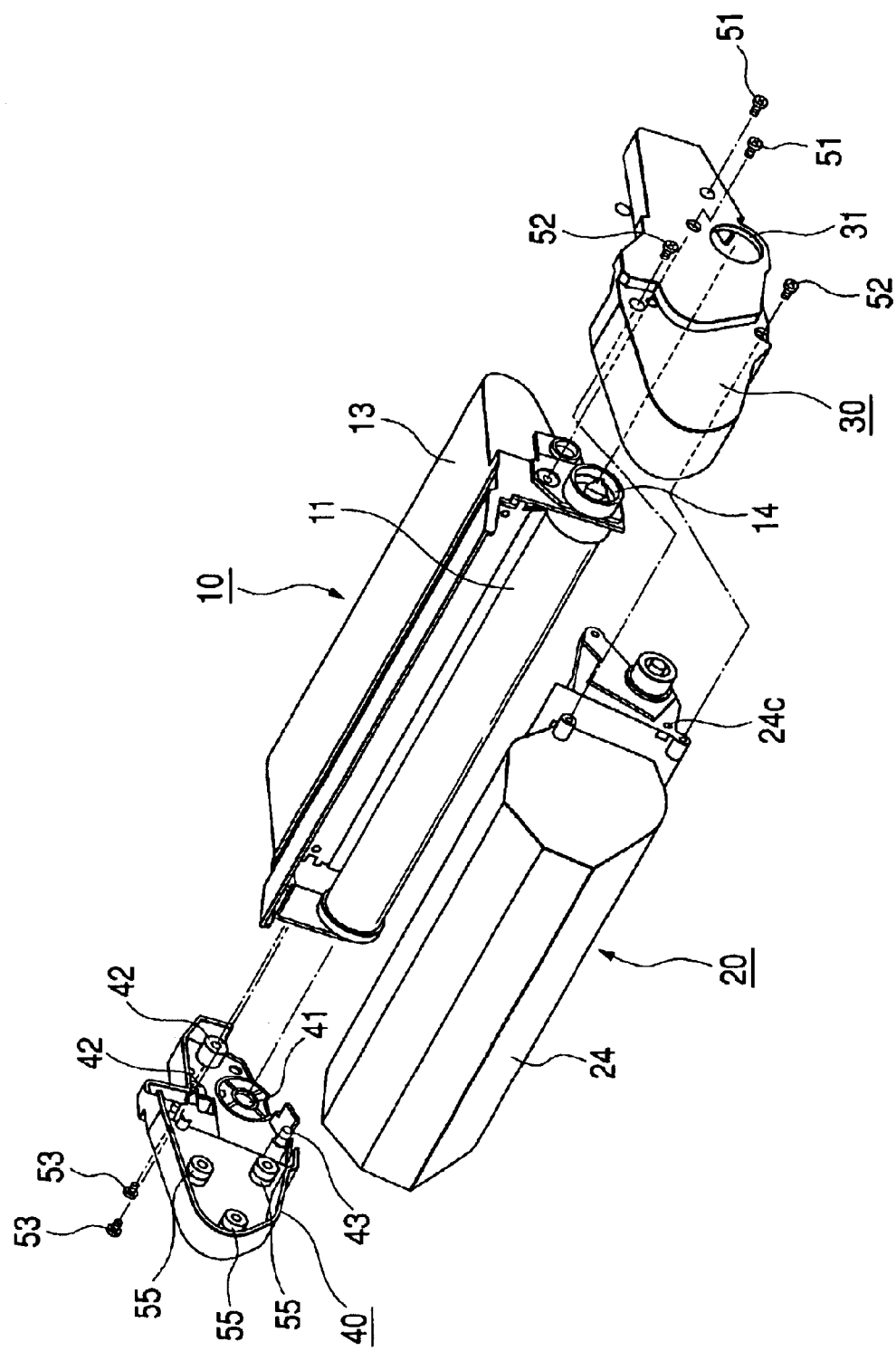
FIG. 8 is an exploded perspective view, as seen from the reverse direction, of the process cartridge of FIG. 4.

Further, by fitting a reference boss 33 of the side cover 30 shown in FIG. 7 into a reference hole 24c of the toner container 24 shown in FIG. 8, the position of the developing unit 20 is determined with respect to the longitudinal direction and the vertical direction. Further, fastening is effected by a screw 52, with a screw-hole end surface of the toner container 24 abutting a screw-hole seat surface 34 of the side cover 30, whereby the developing unit 20 is fixed in position in the longitudinal direction in a fixed state (second fixation means).

Positioning of the side cover 40 serving as the second connection-frame body is effected by fitting a cylindrical portion of the drum shaft 15 into a reference hole 41 with respect to the drum unit 10, whereby the photosensitive drum 11 is fixed in position with respect to the direction perpendicular to the longitudinal direction of the photosensitive drum 1. Further, fastening is effected by a screw 53, with a screw-hole end surface of the drum-frame body 13 abutting a screw-hole seat surface 42 of the side cover 40, whereby fixation is effected with positioning in the longitudinal direction (third fixation means).

Next, a fixation portion (fourth fixation means) for fixing the side cover 40 and the developing unit 20 to each other will be described.

First, by fitting a reference boss 43 of the side cover 40 shown in FIG. 8 into a reference hole 24d of the toner container 24 shown in FIG. 7, positioning of the developing unit 20 is effected with respect to the direction perpendicular to the longitudinal direction of the photosensitive drum 11.

Next, fixation is effected by a caulking-welding operation through the intermediation of a gap W due to the tolerance as shown in FIG. 4, without abutting a caulking-welding portion 55 of the side cover 40 against an opposing surface of a caulking-welding portion 56 of the toner container 24. That is, taking into account a variation in the longitudinal dimension S of the drum-frame body 13, the longitudinal dimension T of the toner container 24, the dimension U of the height difference of the side cover 30, and the dimension V of the height difference of the side cover 40, a tolerance is provided such that the caulking-welding portion 55 of the side cover 40 and the opposing surface of the caulking-welding portion 56 of the toner container 24 are spaced apart from each other by the gap W. In this non-constrained state, the caulking-welding portions are opposed and a caulking-welding operation is performed.

Figure 5A:
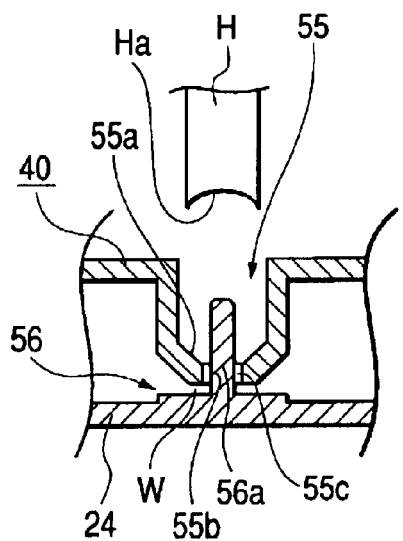
FIGS. 5A, 5B, and 5C are diagrams illustrating how a caulking-welding process is performed on a caulking-welding portion.
Figure 5B:
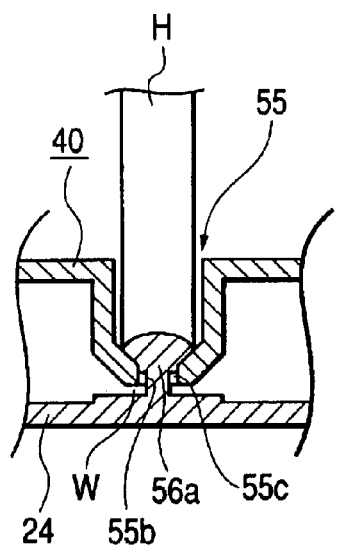
Figure 5C:
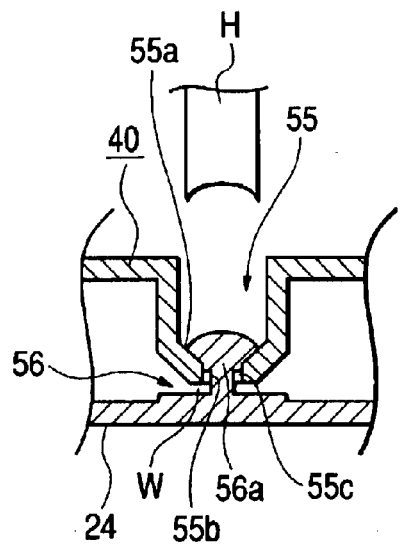

As shown in FIGS. 5A through 5C, the caulking-welding portion 55 of the side cover 40 has an opening equipped with a tapered portion 55a, a hole 55b extending through the bottom wall thereof, etc. In the state in which a welding boss 56a, which is a protrusion of the caulking-welding portion 56 of the toner container 24, is fitted in the hole 55b of the caulking-welding portion 55 of the side cover 40, a caulking portion is formed by a caulking-welding process described below, forming a fixation portion for fixing the side cover 40 and the toner container 24 to each other.

Figure 6A:
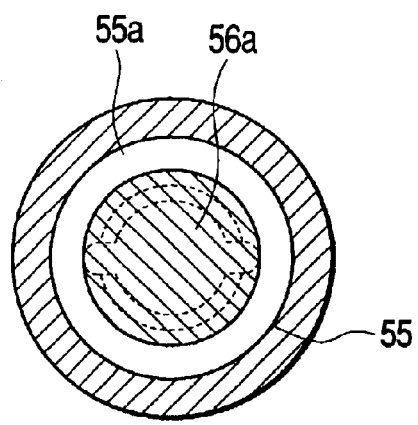
FIGS. 6A, 6B, and 6C are sectional views showing three caulking portions.
Figure 6B:
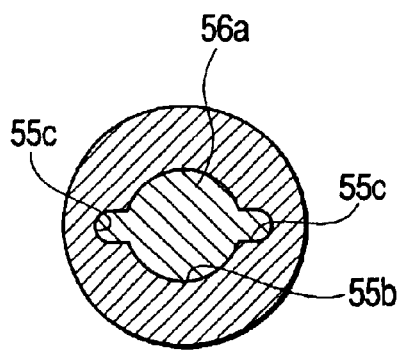
Figure 6C:
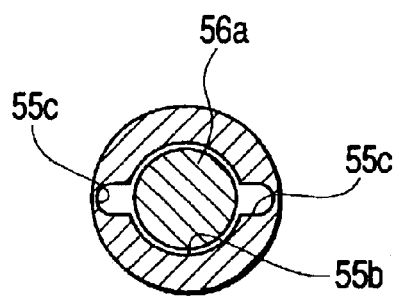

A welding horn H shown in FIGS. 5A through 5C is attached to an ultrasonic generator. By causing the horn H to undergo ultrasonic vibration, resin or the like in contact with the horn H is melted to thereby effect spot welding. First, the caulking-welding portion 55 of the side cover 40 and the caulking-welding portion 56 of the toner container 24 are opposed to each other with the gap W therebetween, and secured to a bearer or the like (not shown) (See FIG. 5A). Next, the horn H is lowered, and the top distal end Ha of the horn H melts the welding boss 56a of the toner container 24, starting to melt the distal end thereof. When, in this condition, the horn H is further lowered, the melted welding boss 56a comes into contact with the tapered portion 55a provided in the caulking-welding portion 55 of the side cover 40. Further, it enters slits 55c, which are recesses provided in the inner wall of the hole 55b, whereby a caulking portion filling a part of the gap between the side cover 40 and the toner container 24 is formed (See FIG. 5B). Then, as shown in FIG. 5C, the horn H is raised. FIGS. 6A through 6C show sectional views of the caulking portion at this time at each position from the top distal end of the welding boss to the base of the welding boss. That is, as shown in FIG. 6A, the head portion of the welding boss 56a after welding spreads over a part of the tapered portion 55a of the void of the caulking-welding portion 55 of the side cover 40 and adheres thereto, and as shown in FIG. 6B, the middle portion of the welding boss 56a fills the hole 55b and the slits 55c of the caulking-welding portion 55 to thereby form a joint portion, which is highly resistant to an external force imparting distortion or the like.

Due to this caulking portion, the side cover 40 and the toner container 24 are secured in position with respect to the longitudinal direction while retaining the gap W.

The welding boss 56a of the toner container 24 comes into contact with the tapered portion 55a of the caulking-welding portion 55 of the side cover 40 to increase the volume of the melted portion. Further, it disperses the force acting in the de-caulking direction in its radial and axial directions, thereby achieving an improvement in terms of resistance to de-caulking. Further, the melted portion also flows into the hole 55b and the slits 55c, so that it is possible to increase the torsional strength as described above.

In this way, fixation is effected by caulking without constraint while maintaining a gap due to tolerance between the opposing portions, whereby the drum unit 10 and the developing unit 20 are connected together without involving distortion of the drum-frame body 13 and the toner container 24, deformation of the side covers 30 and 40, or the like, thereby making it possible to prevent an increase in the driving load of the process cartridge, unevenness in rotation, etc. Further, the reduction in the number of screws and the simplification of the connection process greatly contribute to a reduction in assembly cost and parts cost.

Figure 9:
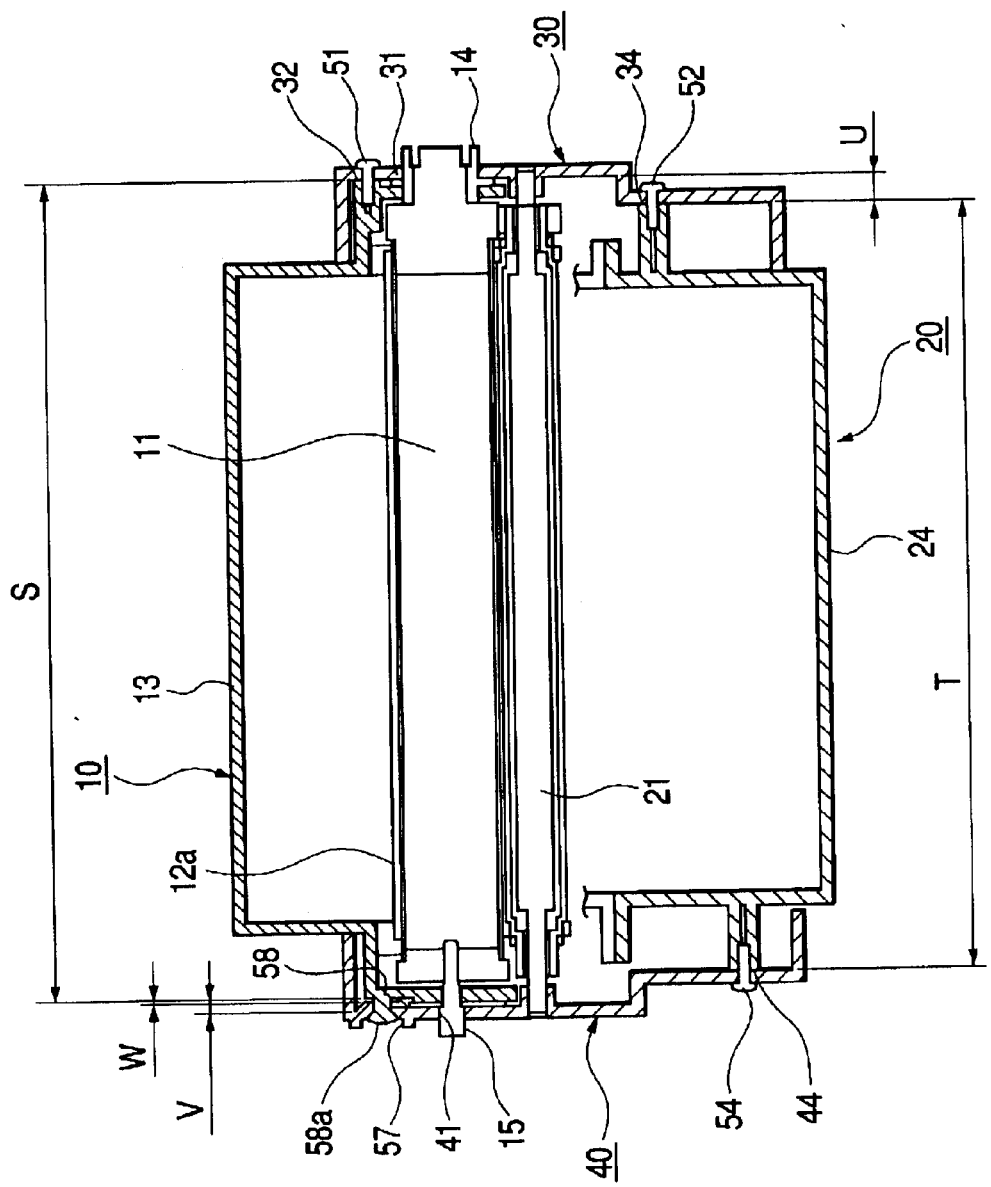
FIG. 9 is a schematic sectional view showing a process cartridge according to a modification of the first embodiment.

FIG. 9 shows a modification, in which while the fixation of the side cover 30 is performed in the same manner as described above, the fixation of the side cover 40 is effected for positioning in the longitudinal direction by using a screw 54, with a screw-hole end surface of the toner container 24 being kept in contact with a screw-hole seat surface 44 of the side cover 40. The side cover 40 and the drum-frame body 13 are connected together by the same caulking-welding process as described above using a welding boss 58a, with a caulking-welding portion 57 of the side cover 40 and a caulking-welding portion 58 of the drum-frame body 13 being opposed to each other with the gap W due to tolerance therebetween.

While in the above-mentioned embodiment fastening means such as screws are used as the abutment-fixation means for the side cover, it is also possible to fix the abutment portion between the side cover and the drum-frame body or the toner container by caulking-welding portions.

Further, instead of fixing the side cover and the toner container, it is also possible to fix the side cover to the developing-frame body fixed to the toner container.

Further, instead of the arrangement in which the welding boss of the caulking-welding portion is cylindrical and a hole into which the welding boss is fit-engaged is a circular or conical hole, it is naturally also possible to adopt a polygonal welding boss with a non-circular section to be fit-engaged with a polygonal hole or polygonal cone hole.

Further, while in the above-mentioned embodiment an ultrasonic welding system is adopted, it is also possible to use a heat-welding system.

<Second Embodiment>

FIGS. 10 through 15 show a second embodiment. The components such as the drum unit 10, the photosensitive drum 11, the drum-frame body 13, the drum bearing 14, the developing unit 20, the developing roller 21, the toner container 24, and the side covers 30 and 40 are the same as those of the first embodiment and are indicated by the same reference numerals, with a description of such components being omitted.

Figure 10:
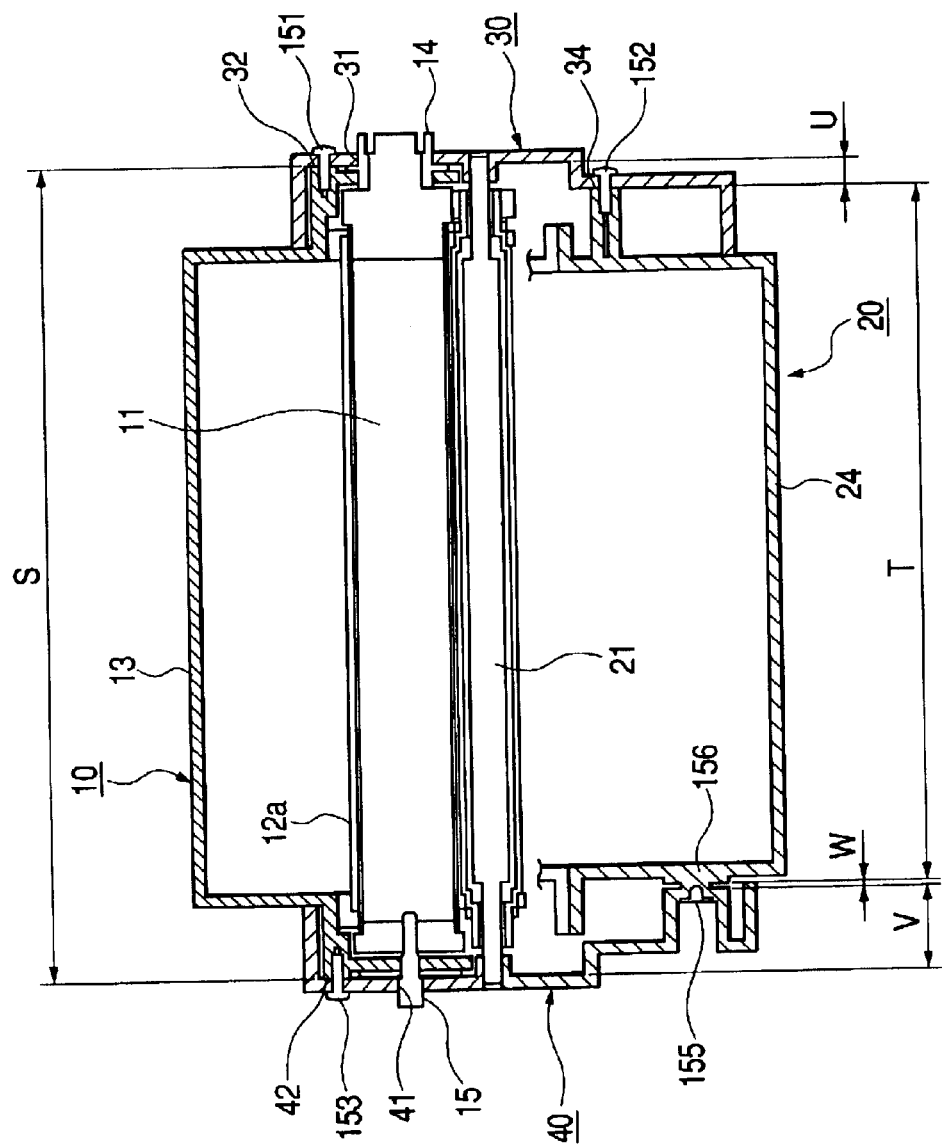
FIG. 10 is a schematic sectional view showing a process cartridge according to a second embodiment of the present invention.
Figure 12:
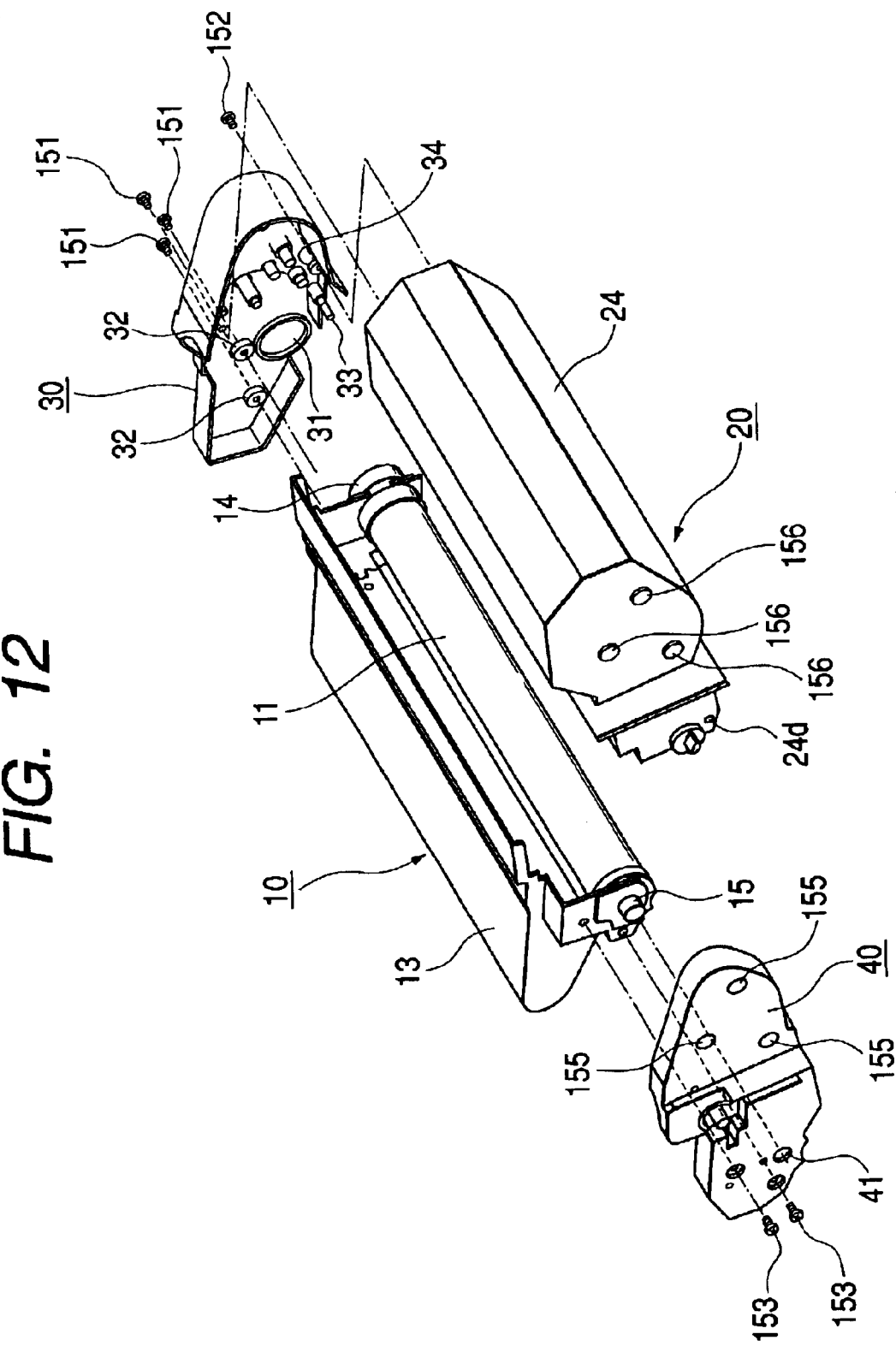
FIG. 12 is an exploded perspective view of the process cartridge of FIG. 10.
Figure 13:
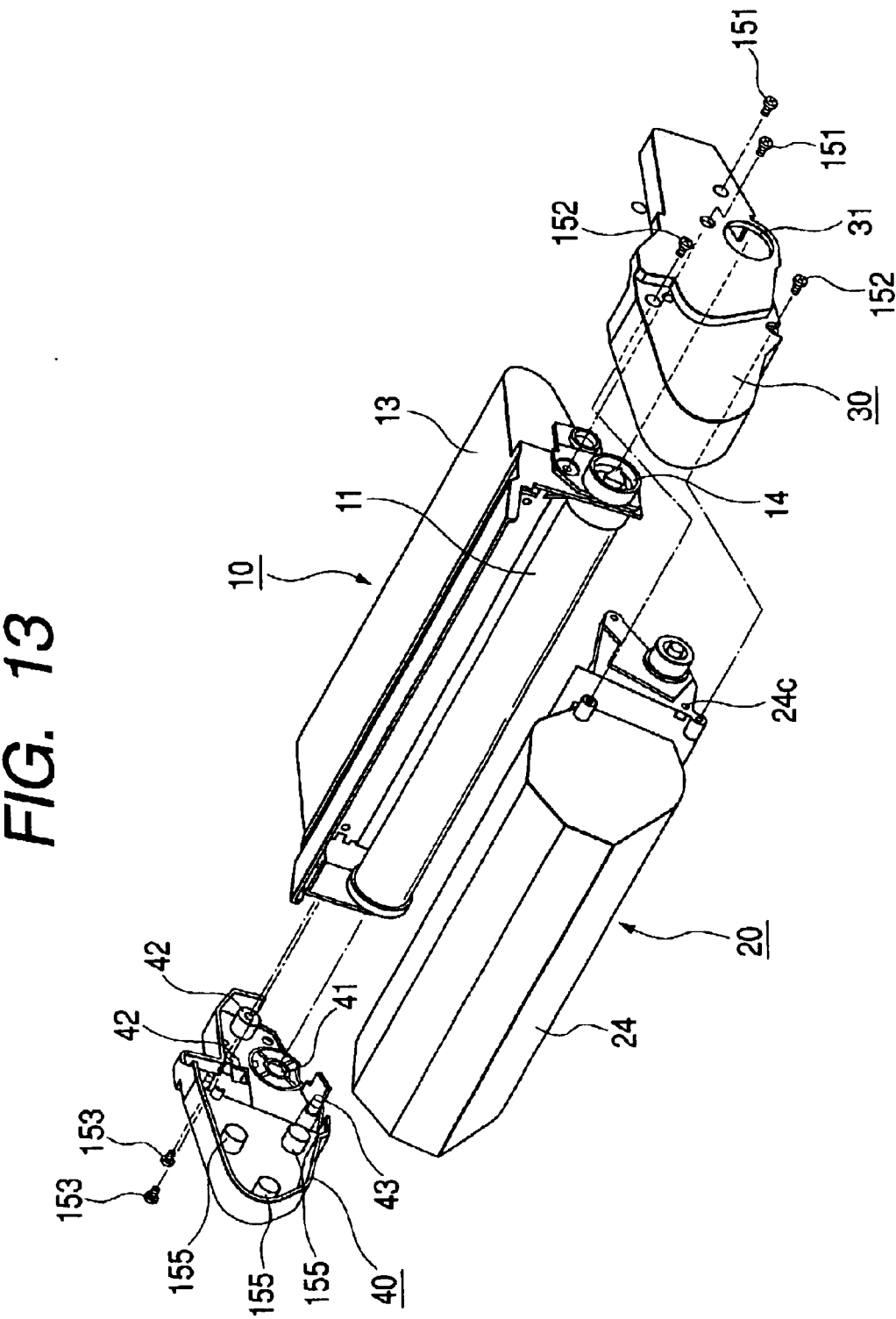
FIG. 13 is an exploded perspective view, as seen from the reverse direction, of the process cartridge of FIG. 10.

The photosensitive drum 11 is mounted to the drum-frame body 13 in the same manner as in the first embodiment. As shown in FIGS. 10, 12, and 13, gear flanges are mounted to the ends of the photosensitive drum 11. One gear flange is rotatably supported by the drum bearing 14, and the other gear flange is rotatably supported by the drum shaft 15. The drum bearing 14 and the drum shaft 15 are supported by the drum-frame body 13 to form the drum unit 10.

The method of connecting the drum unit 10 and the developing unit 20 to each other according to the second embodiment will be described.

As shown in FIG. 10, the drum-frame body 13, which is a first unit-frame body supporting the drum unit 10, and the toner container 24 constituting a second unit-frame body supporting the developing unit 20, are connected to side covers 30 and 40, which are a first connection-frame body and a second connection-frame body arranged on either side, whereby they are fixed to each other. Positioning of the side cover 30 with respect to the drum unit 10 is effected by fitting a cylindrical portion of the drum bearing 14 into the reference hole 31, whereby the position of the photosensitive drum 11 in the direction perpendicular to the longitudinal direction is determined. Further, fixation is effected with using a screw 151 by abutting the screw-hole seat surface 32 of the side cover 30 onto the screw-hole end surface of the drum-frame body 13 as an opposing portion, whereby the positioning in the longitudinal direction is effected for fixation (first fixation means).

Further, by fitting the reference boss 33 of the side cover 30 into the reference hole 24c of the toner container 24, the position of the developing unit 20 is determined with respect to the longitudinal direction and the vertical direction. Further, fastening is effected by a screw 152, with the screw-hole end surface of the toner container 24 abutting the screw-hole seat surface 34 of the side cover 30, whereby the developing unit 20 is fixed in position in the longitudinal direction in a fixed state (second fixation means).

Positioning of the side cover 40 with respect to the drum unit 10 is effected by fitting a cylindrical portion of the drum shaft 15 into a reference hole 41, whereby the photosensitive drum 11 is fixed in position with respect to the direction perpendicular to the longitudinal direction. Further, fastening is effected by a screw 153, with the screw-hole end surface of the drum frame body 13 abutting the screw-hole seat surface 42 of the side cover 40, whereby fixation is effected with positioning in the longitudinal direction (third fixation means).

Next, a fixation portion (fourth fixation means) for fixing the side cover 40 and the developing unit 20 to each other will be described.

First, by fitting the reference boss 43 of the side cover 40 shown in FIG. 13 into the reference hole 24d of the toner container 24 shown in FIG. 12, positioning of the developing unit 20 is effected with respect to the direction perpendicular to the longitudinal direction of the photosensitive drum 11.

Next, by welding a welding portion 155 of the side cover 40 to a welding portion 156 of the toner container 24, there is formed a welding-fixation portion for welding the side cover 40 to the toner container 24. In this process, taking into account a variation in the longitudinal dimension S of the drum-frame body 13, the longitudinal dimension T of the toner container 24, the step dimension U of the side cover 30, and the step dimension V of the side cover 40, the welding portion 155 of the side cover 40 and the welding portion 156 of the toner container 24 are opposed to each other so as to be spaced apart from each other by a predetermined distance with the gap W therebetween.

In the welding-fixation portion, the side cover 40 and the toner container 24 are fixed to each other by the following welding process.

Figure 11A:
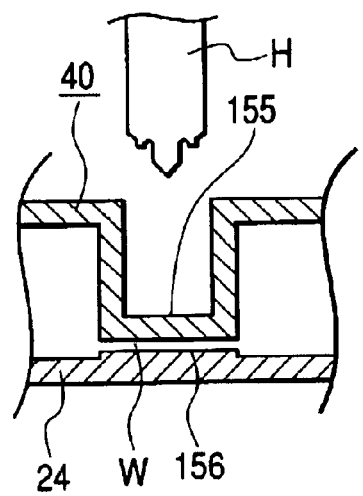
FIGS. 11A, 11B, and 11C are diagrams illustrating how a welding process is performed on a welding portion.
Figure 11B:
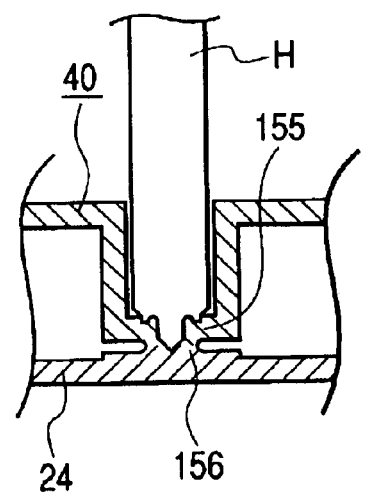
Figure 11C:
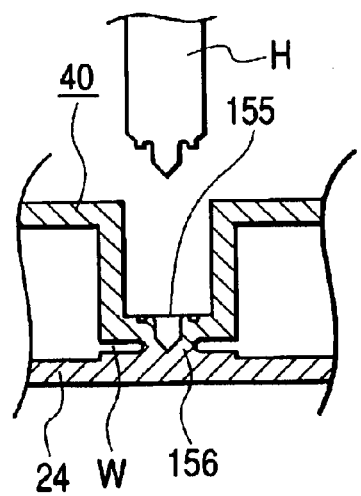

As shown in FIGS. 11A through 11C, the welding horn H is attached to an ultrasonic generator. By causing the horn H to undergo ultrasonic vibration, resin or the like in contact with the horn is melted to thereby effect spot welding. First, the welding portion 155 of the side cover 40 and the welding portion 156 of the toner container 24 are opposed to each other with the gap W therebetween, and are secured to a bearer or the like (not shown) (See FIG. 11A). Next, the horn H is lowered to bring the distal end of the horn H into contact with the welding portion 155 of the side cover 40. When ultrasonic vibration is effected in this condition, the welding portion 155 starts to be melted (See FIG. 11B). When in this condition the horn H is further lowered, the melted welding portion 155 comes into contact with the welding portion 156 of the toner container 24, and the welding portion 156 of the toner container 24 also starts to melt. Then, the horn H is stopped at a position where no hole is made in the welding portion 156 of the toner container 24 and at the stage where the side cover 40 and the toner container 24 are welded together, and then the horn H is raised (See FIG. 11C).

By thus conducting spot welding, there is formed between the side cover 40 and the toner container 24 the welding portion 156 where a part of the gap is filled with resin. Then, the longitudinal position is fixed, with the gap W being substantially remaining the same as before the welding.

In this way, fixation is effected between the opposing portions by opposing the fixation portions through abutment in a non-constrained state, whereby the drum unit 10 and the developing unit 20 are connected together without involving distortion of the drum frame body 13 and the toner container 24, deformation of the side covers 30 and 40, or the like, thereby making it possible to prevent an increase in the driving load of the process cartridge, unevenness in rotation, etc. Further, the reduction in the number of screws and the simplification of the connection process greatly contribute to a reduction in the assembly cost and the parts cost.

Figure 14:
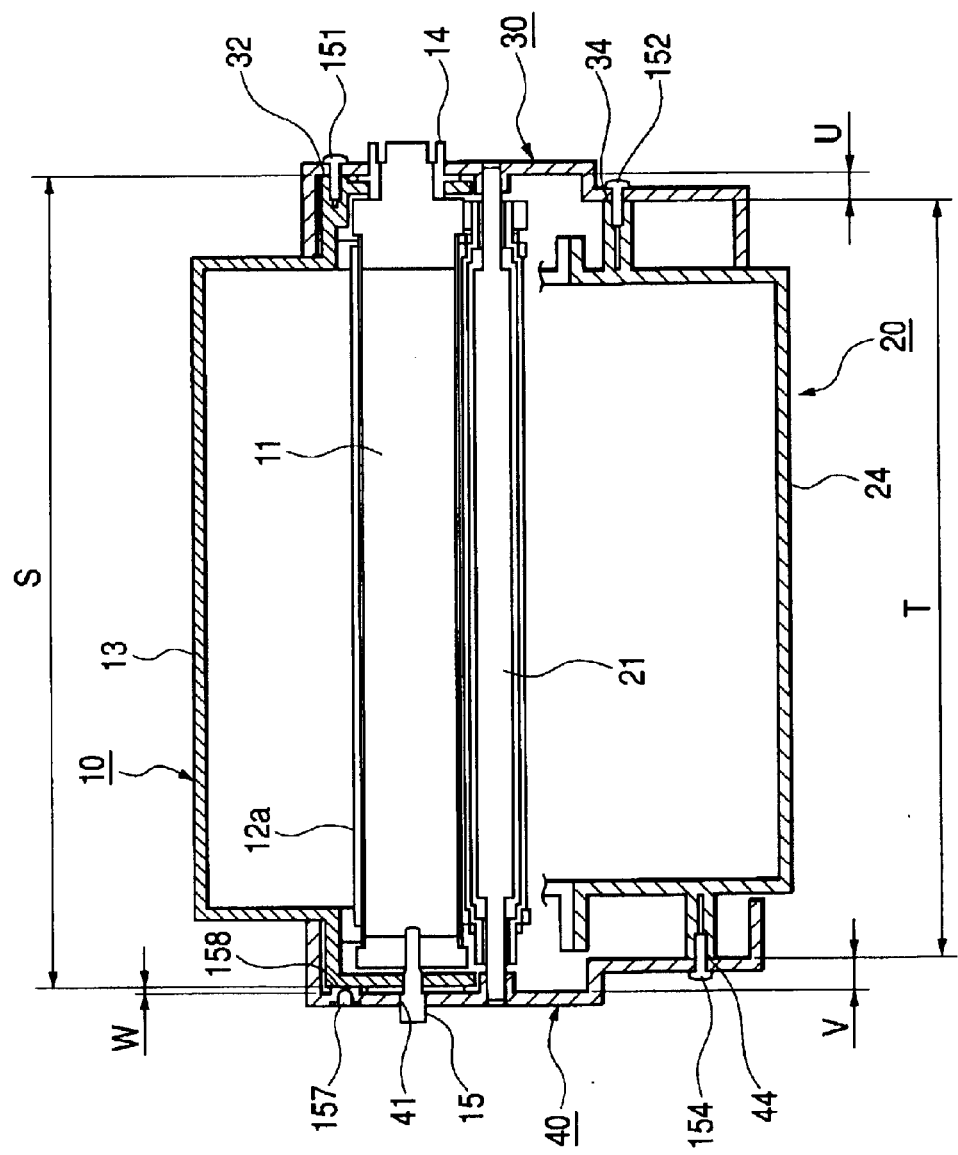
FIG. 14 is a schematic sectional view showing a process cartridge according to a modification of the second embodiment.
Figure 15:
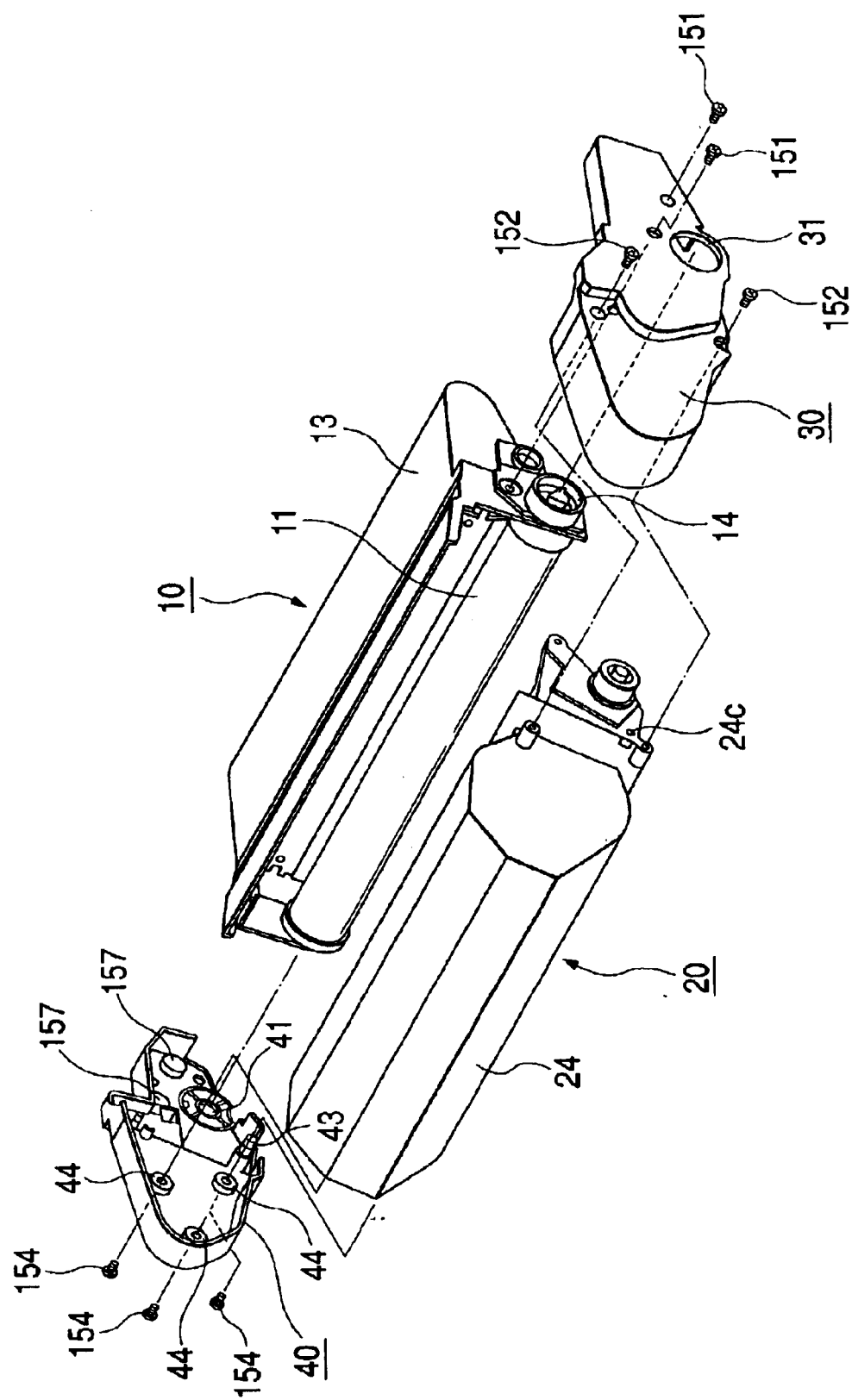
FIG. 15 is an exploded perspective view of the process cartridge of FIG. 14.

FIGS. 14 and 15 show a modification of the second embodiment, in which while the fixation of the side cover 30 is performed in the same manner as described above, the fixation of the side cover 40 is effected for positioning in the longitudinal direction by using a screw 154, with the screw-hole end surface of the toner container 24 being kept in contact with the screw-hole seat surface 44 of the side cover 40. The side cover 40 and the drum-frame body 13 are connected together by the following caulking-welding process, with a welding portion 157 of the side cover 40 and a welding portion 158 of the drum-frame body 13 being opposed to each other with the gap W.

While in the above-mentioned embodiment fastening means, such as screws are used as the fixation for the side cover, it is also possible to fix the abutment portion between the side cover and the drum-frame body or the toner container by a caulking-welding operation.

Further, instead of fixing the side cover and the toner container, it is also possible to fix the side cover to the developing-frame body fixed to the toner container.

Furthermore, while in the above-mentioned embodiment the ultrasonic-welding system is adopted, it is also possible to use the heat-welding system.

<Third Embodiment>

FIGS. 16 through 29 show a third embodiment. The general construction of the electrophotographic image forming apparatus is the same as that of the first embodiment. A process cartridge 202 is composed of the drum unit 10 consisting of the drum-frame body 13 supporting the photosensitive drum 11, the charging roller 7, and the cleaning means 12 including the cleaning blade 12a etc., and a developing unit 220 including a toner container 224, which is a container-frame body having a developing roller 221 supported by a movable developing-frame body 240, a toner-containing portion 224a, which is a developer-containing portion, etc. The charging roller 7, the photosensitive drum 11, the cleaning means 12, the drum-frame body 13, etc., of the process cartridge 202 are the same as those of the first embodiment, and are indicated by the same reference numerals, with a description thereof being omitted.

Figure 17:
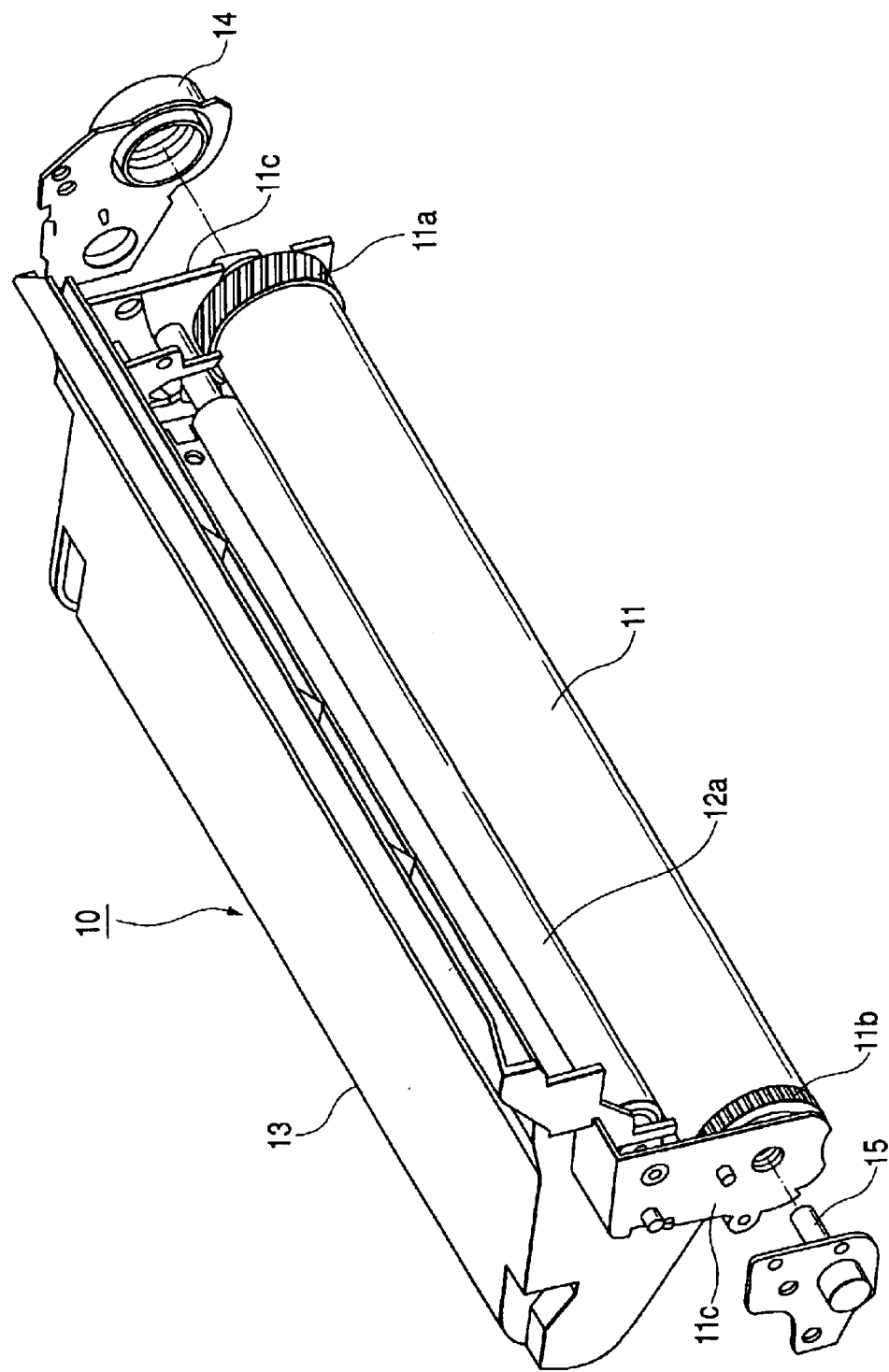
FIG. 17 is a perspective view of a drum unit of the process cartridge of FIG. 16.

The photosensitive drum 11 is mounted to the drum-frame body 13 as shown in FIG. 17. That is, the gear flanges 11a and 11b are mounted to the ends of the photosensitive drum 11. One gear flange 11a is rotatably supported by the drum bearing 14, and the other gear flange 11b is rotatably supported by the drum shaft 15. The drum bearing 14 and the drum shaft 15 are respectively mounted to side plates 11c of the drum-frame body 13, and the photosensitive drum 11 is incorporated in the drum unit 10. Connected to the end portion of one gear flange 11a is a rotation-drive mechanism on the apparatus main body side, whereby torque is imparted from the apparatus-main-body side. A gear in its circumference transmits a driving force to the developing roller 221, etc. Further, a gear in the circumference of the other gear flange 11b transmits a driving force to the transferring roller 4, etc. shown in FIG. 2.

Figure 16:
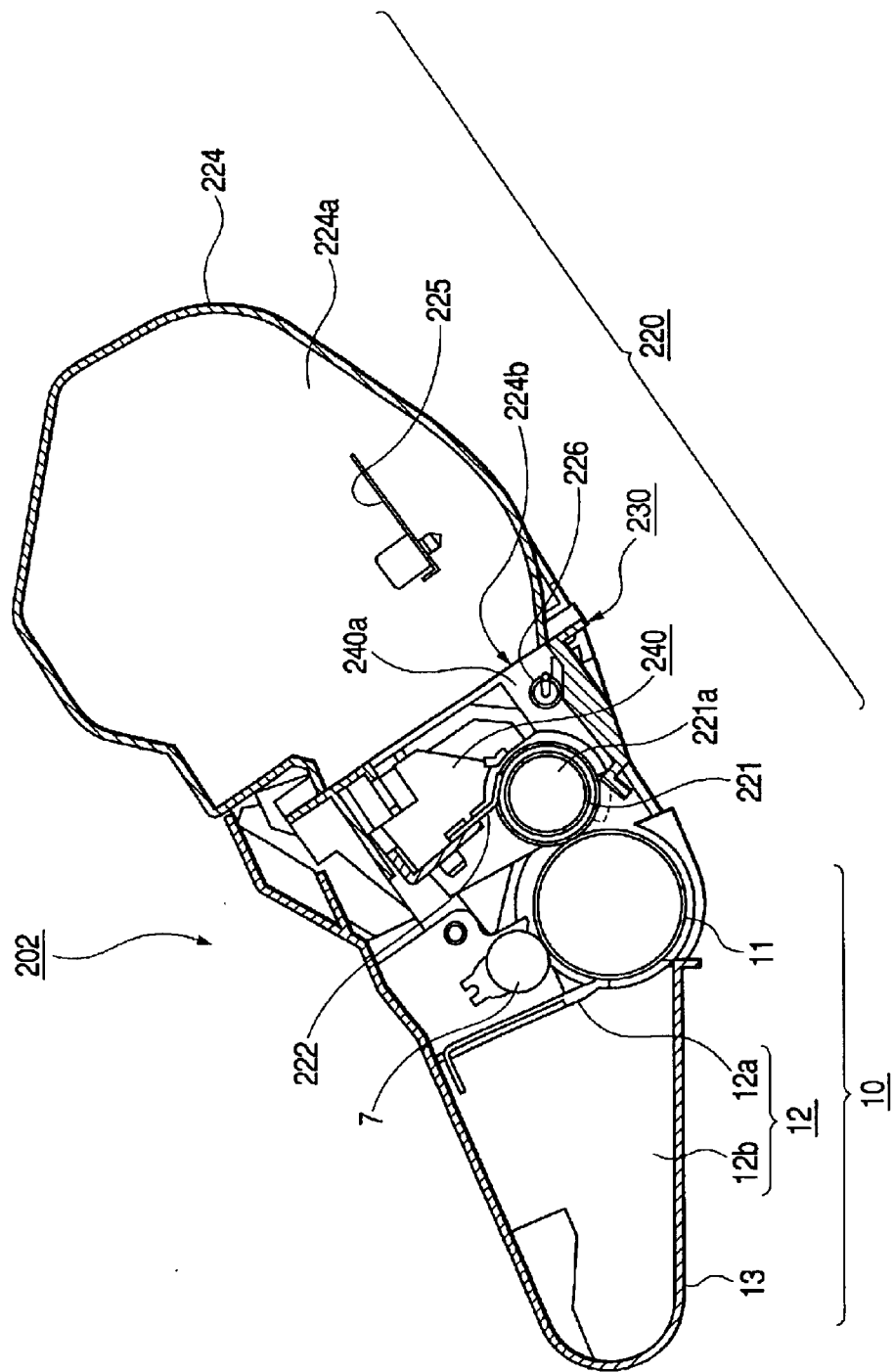
FIG. 16 is a sectional view showing the inner construction of a process cartridge according to a third embodiment of the present invention.

As shown in FIG. 16, the developing unit 220 of the process cartridge 202 of this embodiment has the toner container 224 containing toner, and the movable developing-frame body 240 retaining the developing roller 221, the developing blade 222, etc. As described below, the movable developing-frame body 240 is movably held by the developing-support frame 230, which is formed integrally with the toner container 224.

Toner in the toner container 224 is sent to a developing chamber 240a from a toner-supply opening 224b through rotation of a toner-feeding member 225. The developing roller 221 containing a magnet roller (stationary magnet) 221a is rotated, and a toner layer to which a frictional electrification charge is imparted by the developing blade 222 is formed on the surface of the developing roller 221.

Figure 20:
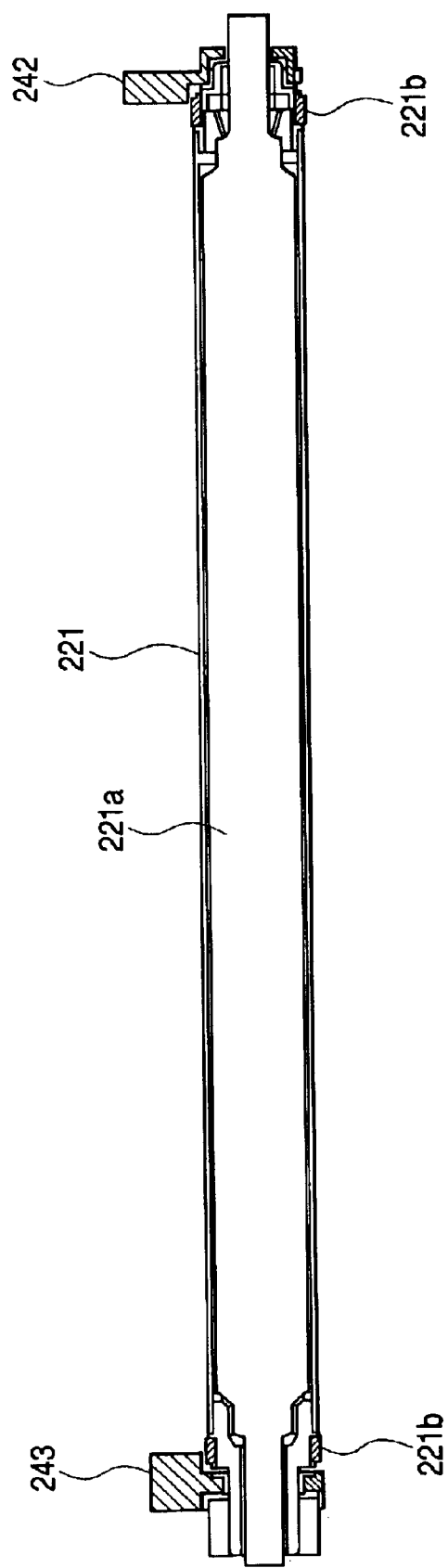
FIG. 20 is a sectional view of a developing roller.
Figure 25:
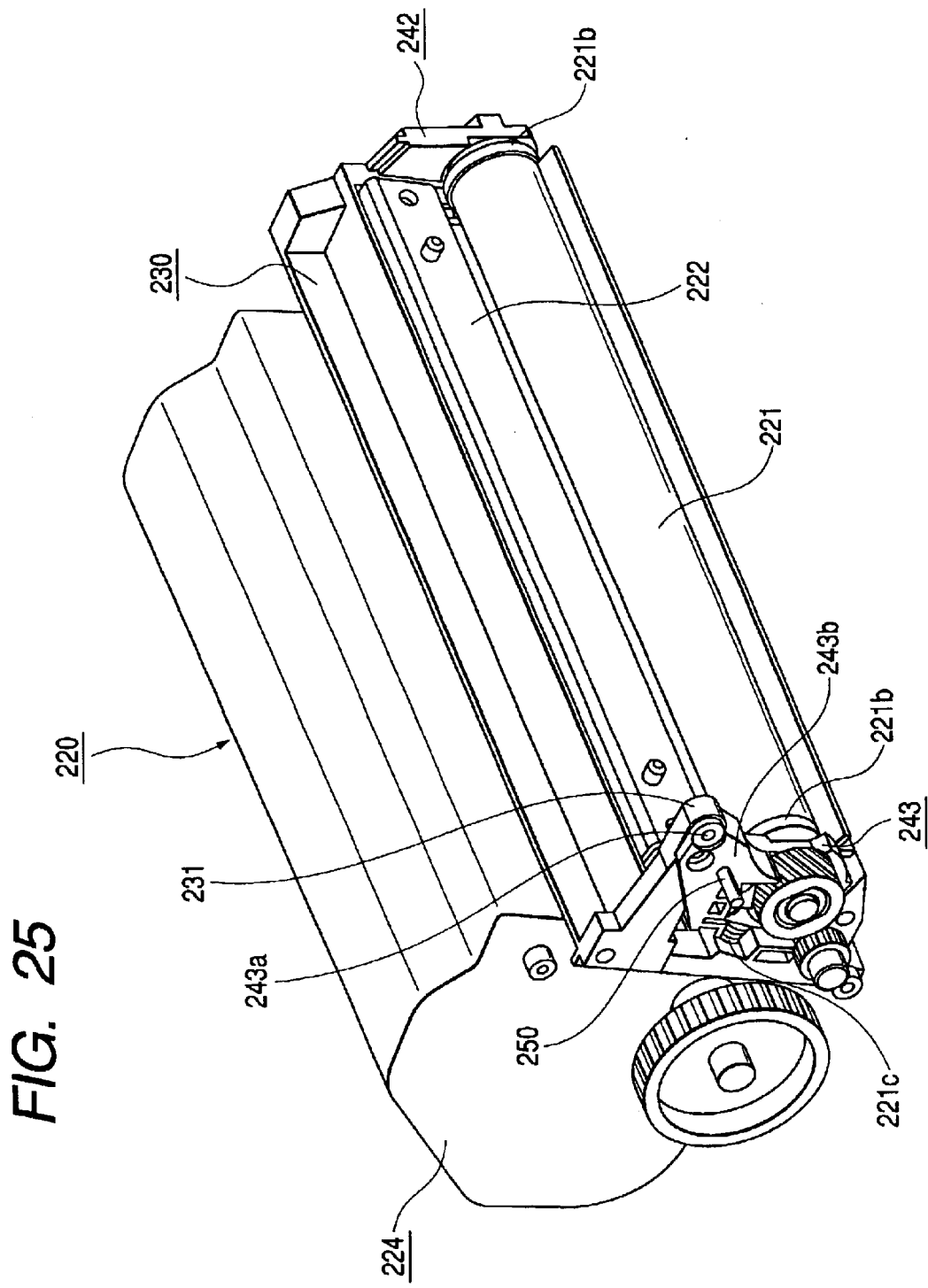
FIG. 25 is a perspective view of a developing unit.

As shown in FIG. 20, the developing roller 221 is pressed against the photosensitive drum 11 by an urging spring described below while maintaining a fixed clearance through the intermediation of spacer rollers 221b, and the toner collected on its surface is supplied to the developing area of the photosensitive drum 11 (See FIG. 25). The toner is transferred to the photosensitive drum 11 according to the above-mentioned electrostatic latent image to thereby form a toner image. The developing blade 222 regulates the amount of toner on the peripheral surface of the developing roller 221, and imparts a frictional electrification charge thereto. Further, in the vicinity of this developing roller 221, a toner-agitating member 226 for circulating the toner in the developing chamber 240a is rotatably mounted.

Figure 21:
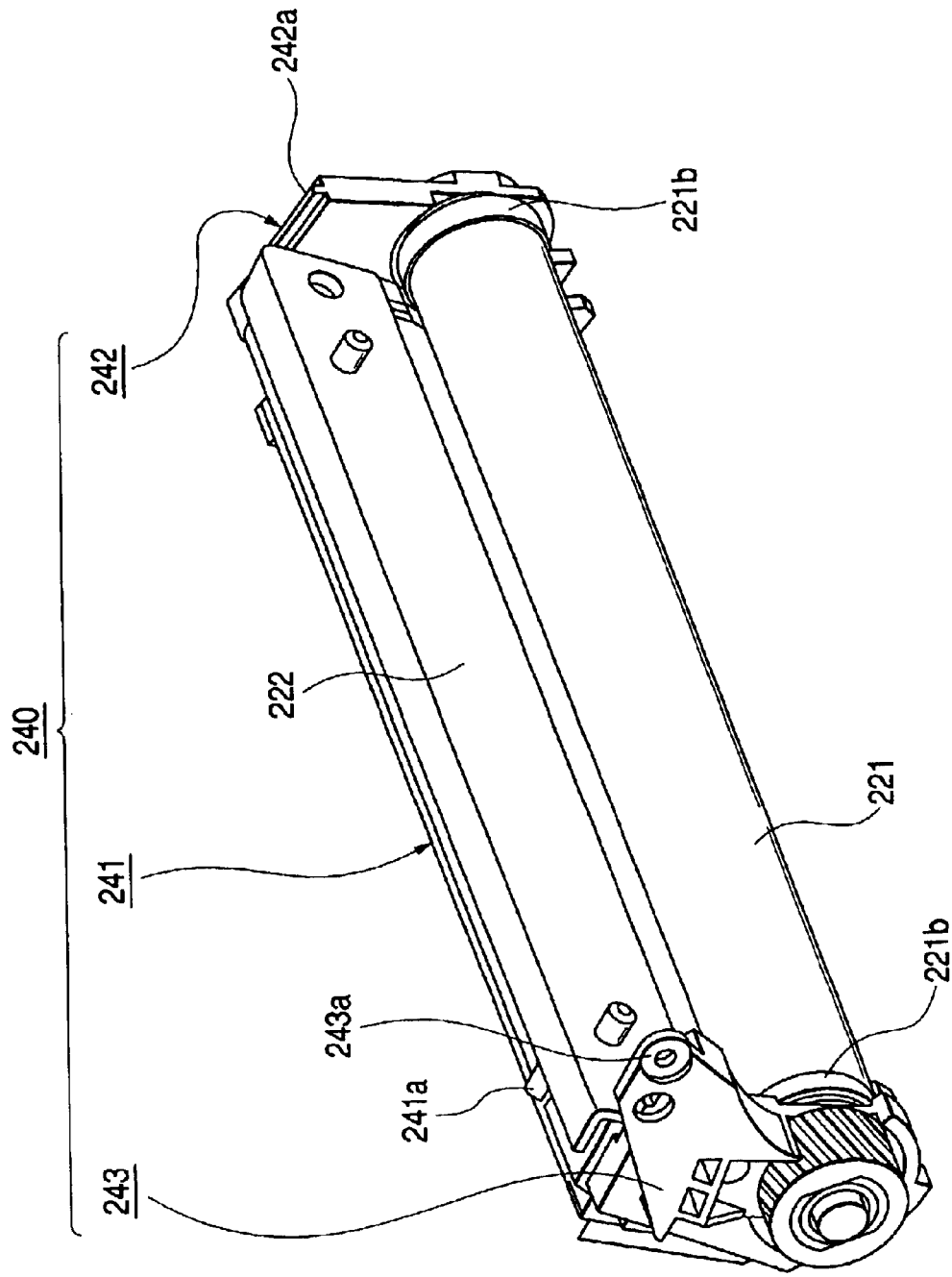
FIG. 21 is a perspective view of the developing roller and a movable developing-frame body.

As described above, the movable developing-frame body 240 of the developing device unit 220 is retained by the developing-support-frame 230 which is formed integrally with the toner container 224. As shown in FIG. 21, it is composed of a movable frame 241, and a slide frame 242 and an oscillation frame 243 arranged at the ends thereof. The components are formed into an integral unit which retains the developing roller 221 and the developing blade 222.

The developing roller 221 is rotatably supported at its ends by the slide frame 242 and the oscillation frame 243. Further, rotatably provided at the both ends of the developing roller 221 are the spacer rollers 221b, which are substantially coaxial with the developing roller 221 and whose outer diameter is larger than that of the developing roller 221 by a predetermined gap. The developing blade 222 functioning as the regulating means for regulating the thickness of the toner layer on the developing roller 221 is fixed to the movable frame 241, and the distal end of the developing blade 222 is in contact with the developing roller 221.

As shown in FIGS. 22 through 25, the movable developing-frame body 240 is installed in the developing-support frame 230 fixed to the toner container 224. In the oscillation frame 243 of the movable developing-frame body 240, there is provided an oscillation arm 243b having an oscillation hole 243a. The developing-support frame 230, formed integrally with the toner container 224, is provided with a support arm 231 having at its end a fixation hole 231a coaxial with the oscillation hole 243a. The oscillation frame 243 is oscillatably engaged with the developing-support frame 230 of the toner container 224 by an engagement pin 250. The engagement pin 250 is slidably engaged in loose fit with the oscillation hole 243a of the oscillation frame 243, whereas the engagement pin 250 is forcibly engaged in tight fit with the fixation hole 231a of the developing-support frame 230 of the toner container 224 (See FIG. 25).

Provided between the developing-support frame 230 and the oscillation frame 243 of the toner container 224 is the above-mentioned urging spring 221c, which presses the developing roller 221, retained by the movable developing-frame body 240 against the photosensitive drum 11 with a fixed clearance therebetween through the intermediation of the spacer rollers 221b.

Figure 23:
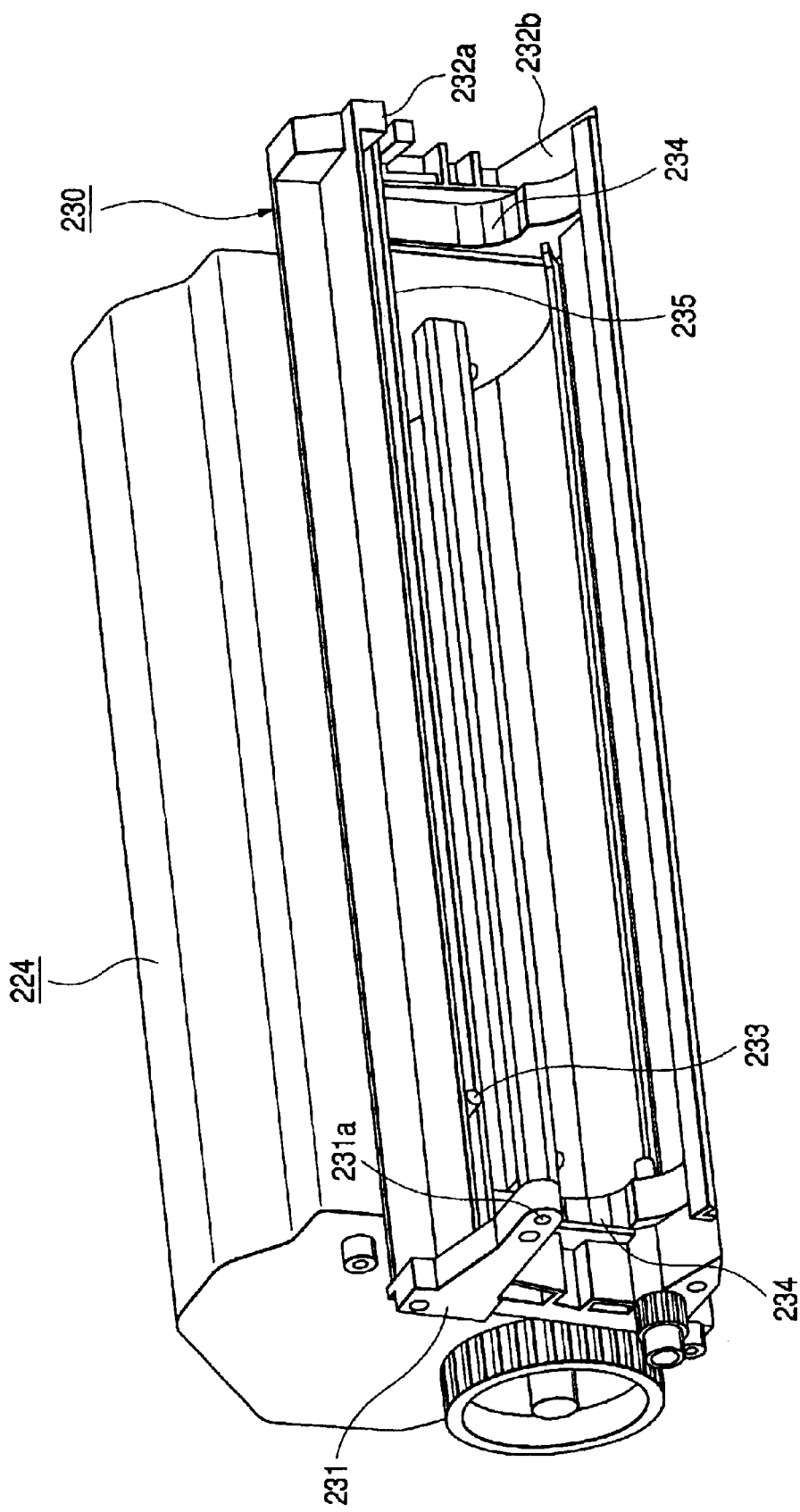
FIG. 23 is a perspective view of a toner container and a developing-support frame.
Figure 24:
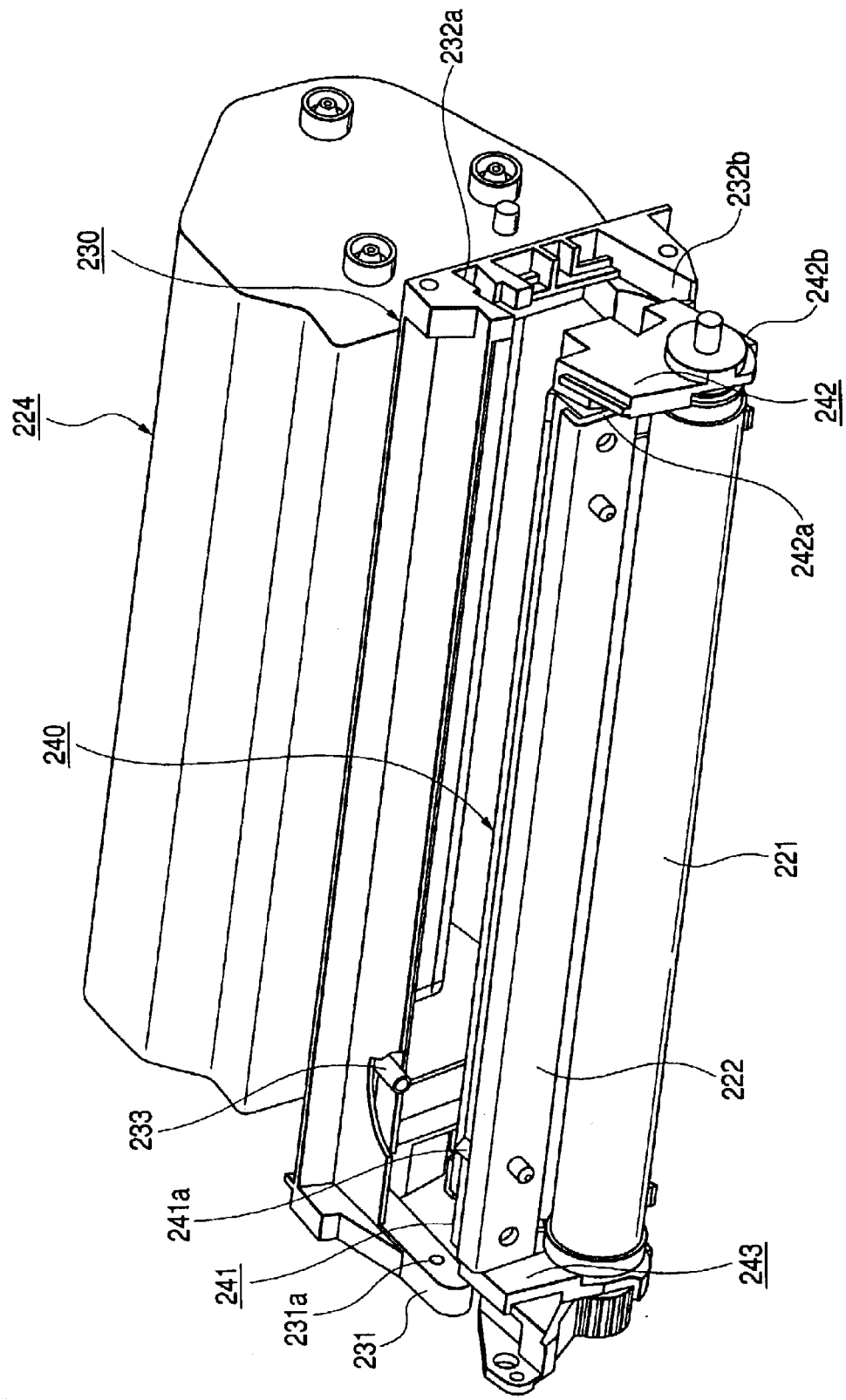
FIG. 24 is a perspective view showing the state immediately before incorporation of the movable developing-frame body in the toner container.

As shown in FIGS. 23 and 24, slide portions 242a and 242b for regulating the sliding direction are provided parallel to each other substantially on the upper and lower surfaces of the slide frame 242 of the movable developing-frame body 240. At the positions opposing the slide portions 242a and 242b of the slide frame 242 when the movable developing-frame body 240 is installed in the developing-support frame 230 of the toner container 224, there are provided guide portions 232a and 232b, with minute clearances therebetween.

Further, to effect positioning on the movable developing-frame body 240 with respect to the longitudinal direction of the developing-support frame 230 of the toner container 224, the developing-support frame 230 is equipped with a positioning boss 233. Further, the movable frame 241 of the movable developing-frame body 240 is equipped with an elongated positioning hole 241a for positioning in the longitudinal direction only. Due to the slide portions 242a and 242b and the guide portions 232a and 232b, the slide frame 242 can slide in a fixed direction.

Figure 22:
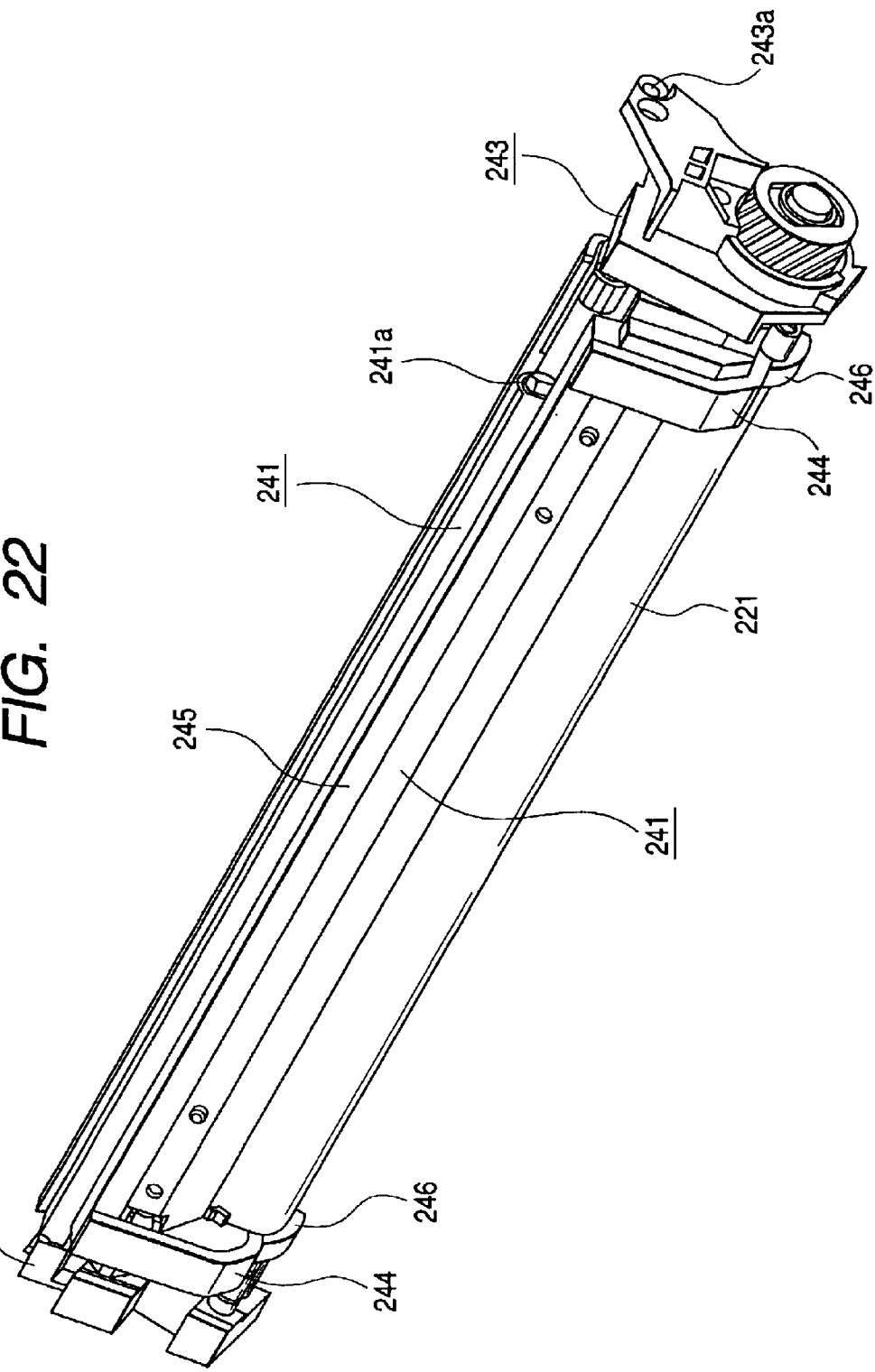
FIG. 22 is a perspective view of the back side of the movable developing-frame body.
Figures 26, 27:
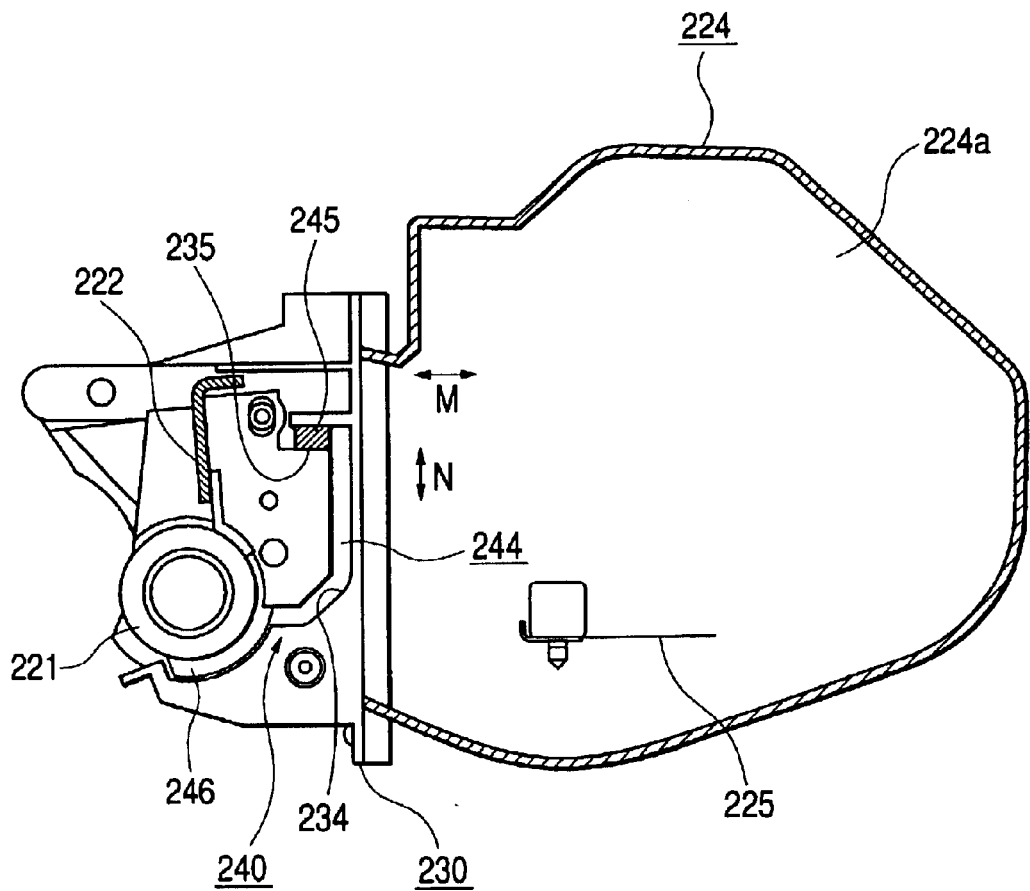
FIG. 26 is a sectional view illustrating the interior of the developing unit.
FIG. 27 is a diagram illustrating a developing roller and a magnetic seal.

FIG. 22 shows the construction of a toner seal provided between the developing-support frame 230 and the movable developing-frame body 240. By using double coated tapes, elastic seal members 244 are attached to the ends of the movable frame 241, and an elastic seal member 245 is attached to the upper long-side portion of the movable frame 241. As shown in FIG. 26, the elastic seal members are compressed by seal-receiving surfaces 234 and 235 of the developing-support frame 230 on the toner container 224 side to thereby provide a sealing effect.

In FIG. 26, the arrows M and N respectively indicate the directions in which the elastic seal members 244 at the ends and the elastic seal member 245 on the upper long-side portion are compressed. The direction N in which the elastic seal member 245 is compressed is set to be substantially perpendicular to the moving direction of the movable developing-frame body 240. Due to this arrangement, it is possible to mitigate the influence of the resilient force of the elastic seal member 245 with a large compression area on the pressurizing force with which the developing roller 221 is pressed against the photosensitive drum 11, thereby stabilizing the pressurizing force.

FIG. 27 shows the construction of toner seals at the ends of the developing roller 221. A magnetic seal 246 provided at each end of the developing roller 221 has a plurality of magnetic poles on its surface 246a opposed to the surface of the developing roller 221, and serves as a sealing means for attracting toner by a magnetic curtain between it and the developing roller 221.

Each magnetic seal 246 is inserted into a recess provided in the movable frame 241 for positioning, and pressurized by the developing blade 222 to be secured in position. Since the developing roller 221 and the magnetic seal 246 are fixed to the same movable frame 241, the developing roller 221 follows the outer periphery of the photosensitive drum 11, and even if the movable frame 241 moves, it is possible to set a fixed clearance accurately between the developing roller 221 and the magnetic seal 246. Thus, toner sealing can be effected in a satisfactory manner at the ends of the developing roller 221 by the magnetic seals 246.

Next, the method of connecting the drum unit 10 and the developing unit 220 to each other will be described.

FIGS. 18, 19A through 19C, 28, and 29 show how the drum unit 10 and the developing unit 220 are connected to each other. The drum-frame body 13 of the drum unit 10, which is the first unit-frame body, and the toner container (container-frame body) 224 of the developing unit 220, which is the second unit-frame body, are connected to each other at the longitudinal ends by side covers 330 and 340 serving as the first connection-frame body and the second connection-frame body.

Figure 28:
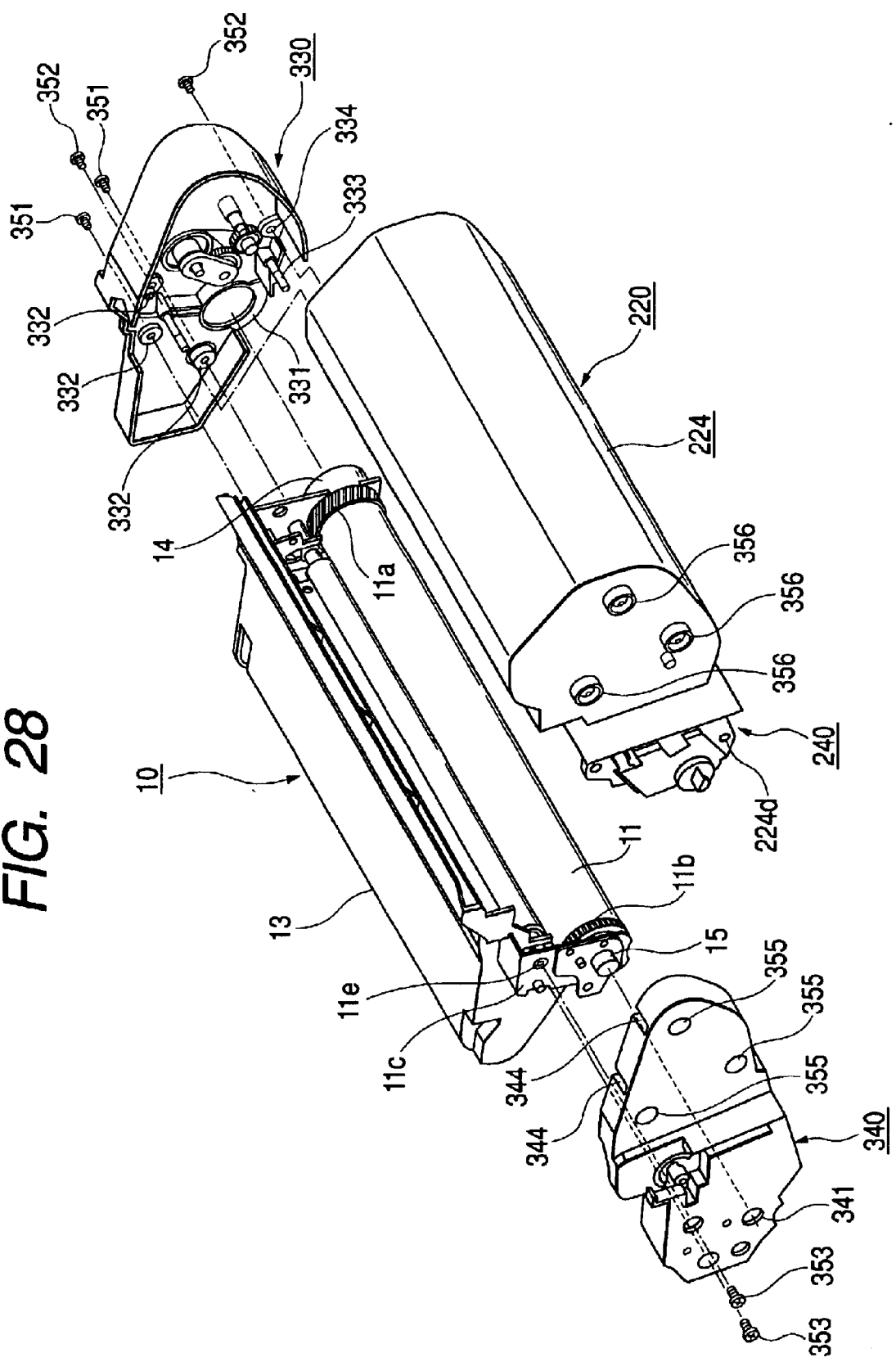
FIG. 28 is an exploded perspective view of the process cartridge of FIG. 18.
Figure 29:
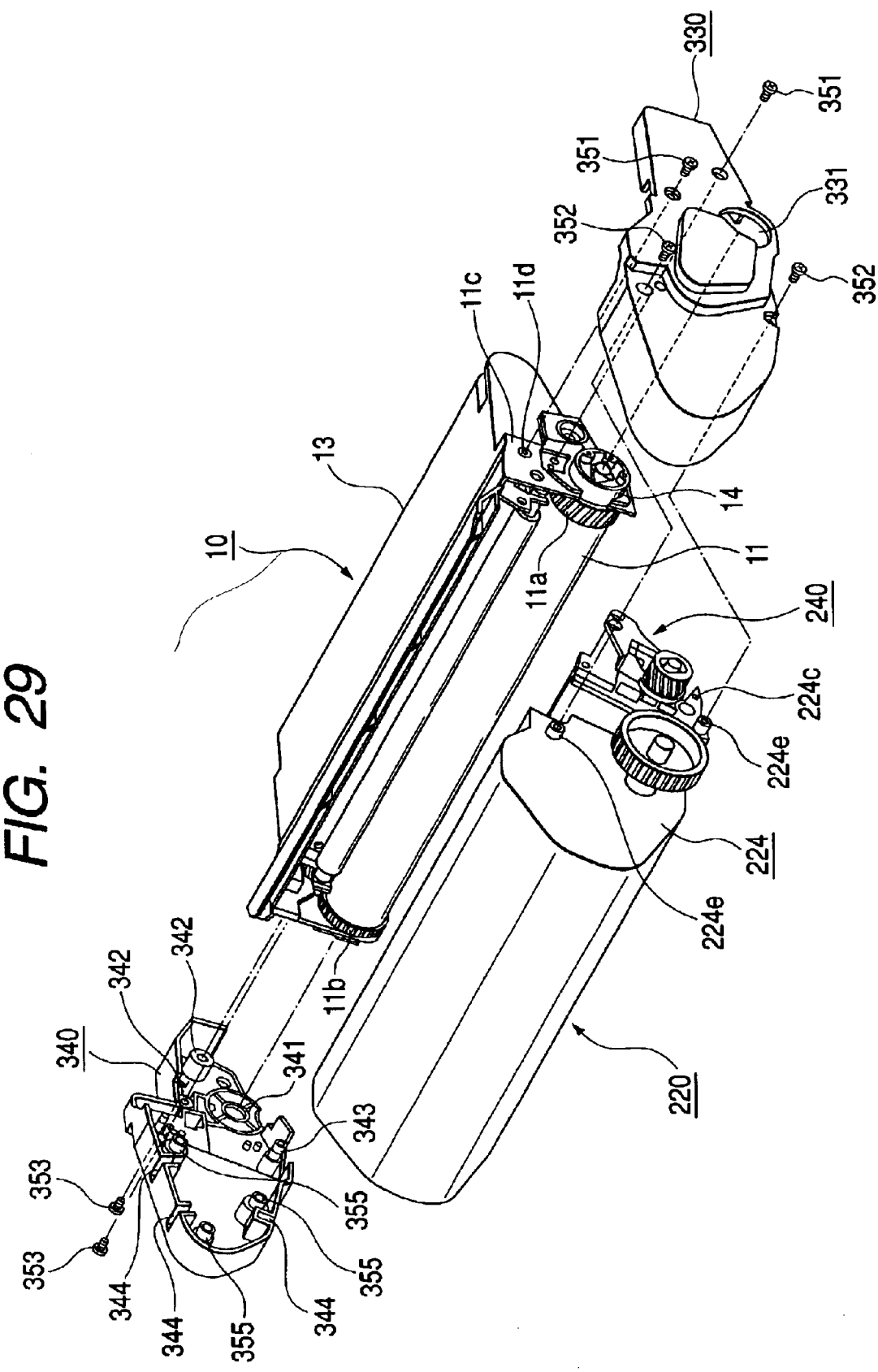
FIG. 29 is an exploded perspective view, as seen from the reverse direction, of the process cartridge of FIG. 18.
Figure 30:
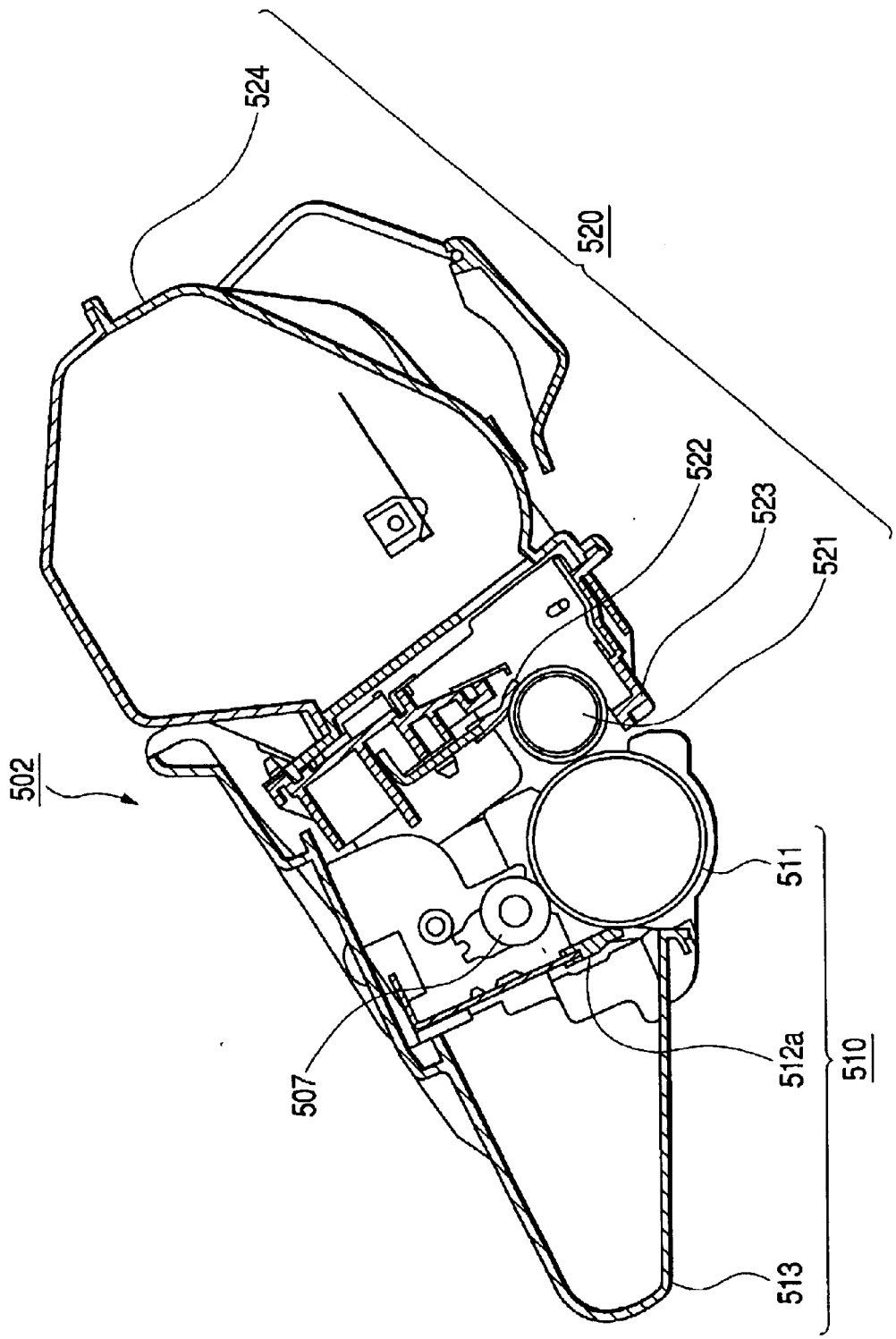
FIG. 30 is a sectional view showing the inner construction of a conventional process cartridge.

As shown in FIGS. 28 and 29, one side cover 330 is equipped with a reference hole 331 into which the cylindrical portion of the drum bearing 14 rotatably supporting the gear flange 11a of the photosensitive drum 11 is to be fitted, and a reference boss 333 to be fitted into the reference hole 224c of the developing unit 220.

Positioning of the side cover 330 with respect to the drum unit 10 is effected by fitting a cylindrical portion of the drum bearing 14 into a reference hole 331, whereby the position of the photosensitive drum 11 in the direction perpendicular to the longitudinal direction is determined. Further, fastening is effected by a screw 351, with a screw-hole end surface 11d of the drum frame body 13 abutting a screw-hole seat surface 332 of the side cover 330, whereby the positioning in the longitudinal direction is effected for fixation (first fixation means).

Similarly, by fitting the reference boss 333 of the side cover 330 into the reference hole 224c of the developing unit 220, the position of the developing unit 220 is determined with respect to the direction perpendicular to the longitudinal direction of the photosensitive drum 11. Further, fastening is effected by a screw 352, with a screw-hole end surface 224e of the developing unit 220 abutting a screw-hole seat surface 334 of the side cover 330, whereby the developing unit 220 is fixed in position in the longitudinal direction (second fixation means).

The other side cover 340 is equipped with a reference hole 341 into which the cylindrical portion of the drum shaft 15 rotatably supporting the gear flange 11a of the photosensitive drum 11 is to be fitted, and a reference boss 343 which is to be fitted into a reference hole 224d of the developing unit 220.

The side cover 340 is subjected to positioning with respect to the drum unit 10 by fit-engaging its reference hole 341 with the cylindrical portion of the drum shaft 15, and is determined in position in the direction perpendicular to the longitudinal direction of the photosensitive drum 11. Further, by attaching a screw 353, a screw-hole end surface lie of the drum frame body 13 and a screw-hole seat surface 342 of the side cover 340 are held in contact with each other, thereby effecting positioning in the longitudinal direction for fixation (third fixation means).

Further, the side cover 340 and the developing unit 220 are fixed to each other by resin connection as described below (fourth fixation means). The side cover 340 and the toner container 224 of the developing unit 220 have resin-connection portions 355 and 356 on their opposing surfaces, and are fixed together by pouring molten resin into the gap between the resin-connection portions 355 and 356. The connection process will be described below.

Figure 18:
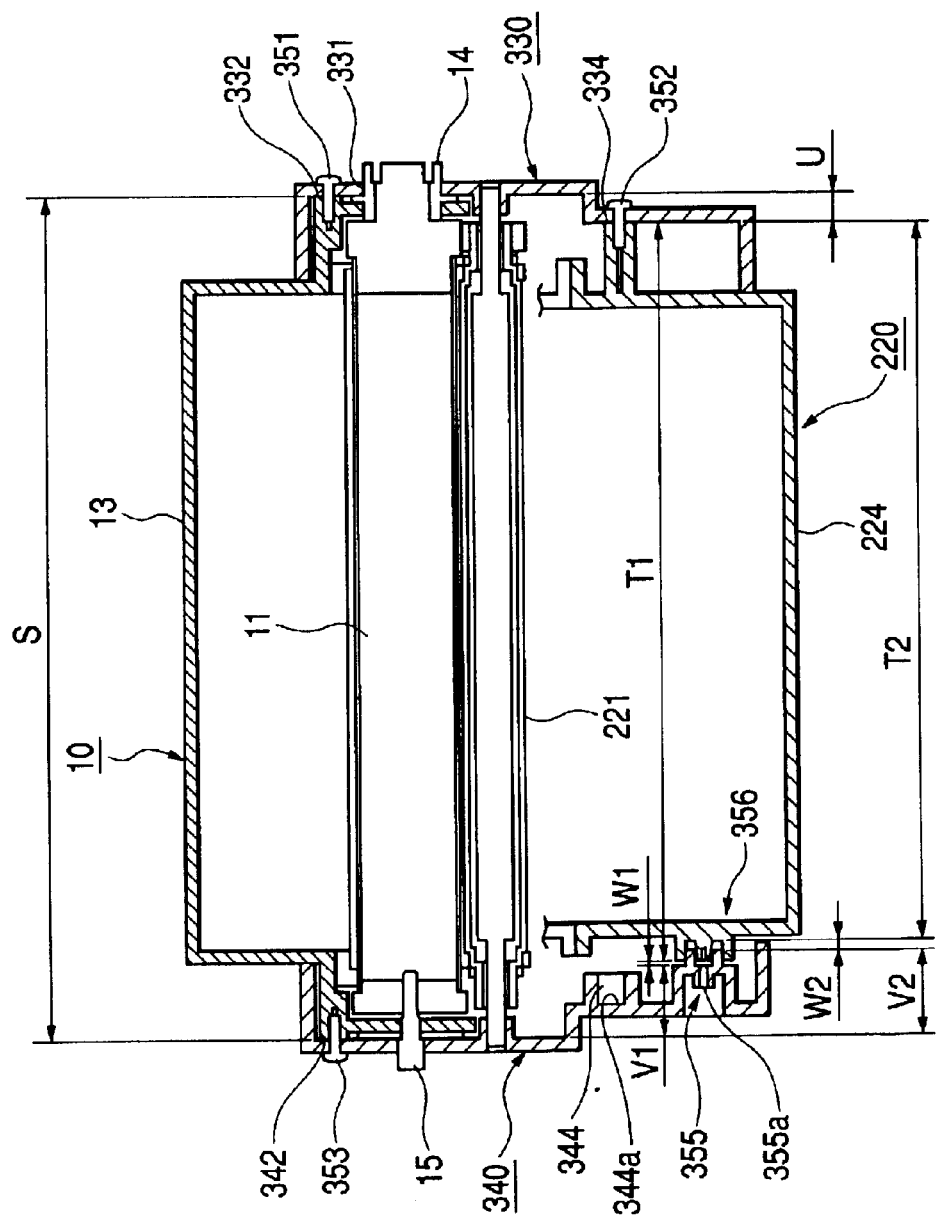
FIG. 18 is a schematic sectional view of the process cartridge according to the third embodiment.

As described above, by fitting the reference boss 343 of the side cover 340 into the reference hole 224d of the developing unit 220, the developing unit 220 is determined in position in the direction perpendicular to the longitudinal direction of the photosensitive drum 11. At this time, as shown in FIG. 18, taking into account a variation in the longitudinal dimension S of the drum frame body 13, the longitudinal dimensions T1 and T2 of the developing unit 220, the step dimension of U of the side cover 330, and the step dimensions V1 and V2 of the side cover 340, the resin connection portion 355 of the side cover 340 and the resin-connection portion 356 of the developing unit 220 are opposed to each other at two positions, with gaps W1 and W2 therebetween, to form a fixation portion. Further, by the connection process described below, the side cover 340 and the developing unit 220 are fixed to each other.

It is also possible to join the side cover 340 and the developing unit 220 to each other by abutment fixation, and to fix the side cover 340 and the drum unit 10 to each other by an resin connection. However, since space can be secured more easily for the developing unit than for the drum unit, the side cover 340 and the developing unit 220 are fixed together by an resin connection in this embodiment in order to achieve an improvement in terms of freedom in design regarding the arrangement and configuration of the resin-connection portion.

During its assembly, the process cartridge 202 is retained by a jig (not shown) or the like, with the side cover 330, the drum unit 10, and the developing unit 220 fixed together by fastening, and the side cover 340 and the drum unit 10 fixed together by fastening. That is, the side surface of the side cover 330 is abutted against the jig for fixation, and the receiving surface 344a of the receiving portion 344 provided on the side cover 340 is abutted against the jig for positioning.

At this time, as described above, there are gaps W1 and W2 between the resin-connection portion 355 of the side cover 340 and the resin-connection portion 356 of the developing unit 220. Then, in this fixed and retained state, molten resin is poured through an injection port 355a of the resin-connection portion 355 of the side cover 340, whereby the resin connection of the side cover 340 and the developing unit 220 is effected.

Figure 19A:
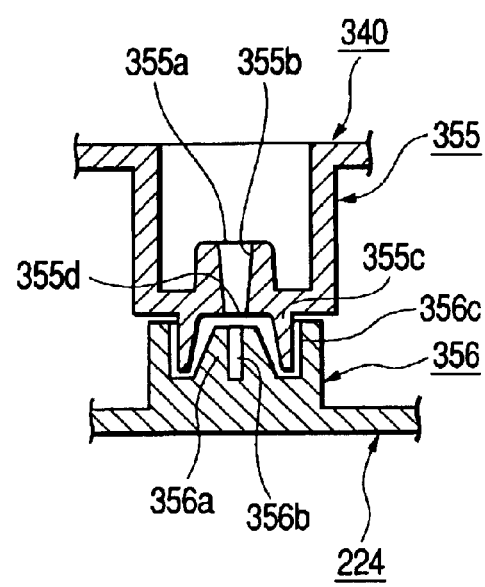
FIGS. 19A, 19B, and 19C are diagrams illustrating how a joining process is performed on a resin-connection portion.
Figure 19B:
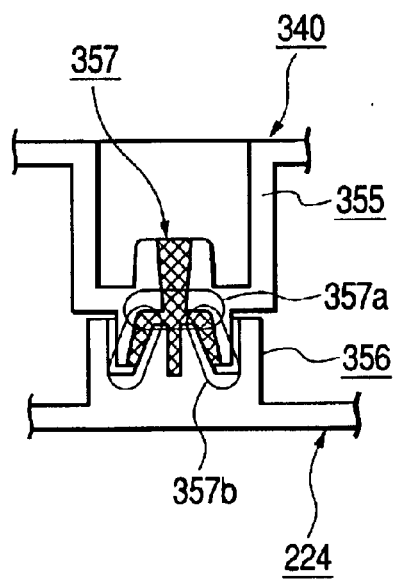
Figure 19C:
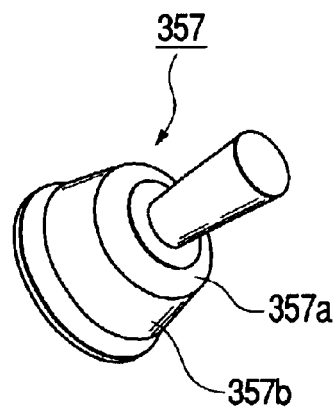

FIGS. 19A through 19C are diagrams illustrating the construction of the resin-connection portions 355 and 356. FIG. 19A is a sectional view of the resin-connection portions 355 and 356 before welding, FIG. 19B is a sectional view showing the state in which molten resin has been injected into the resin-connection portions 355 and 356, and FIG. 19C is a perspective view showing the configuration of the injected molten resin 357. The resin-connection portion 355 of the side cover 340 has an injection port 355a and an injection-flow passage 355b for injecting molten resin, and a substantially cylindrical protrusion 355c for forming the connection portion.

The configuration of the injection-flow passage 355b is such that its opening (outer diameter) gradually decreases toward the downstream side with resect to the resin-injecting direction. Due to this configuration, it is possible to increase the strength of the resin connection in the longitudinal direction.

Further, the resin-connection portion 356 of the toner container 224 of the developing unit 220 has a substantially cylindrical protrusion 356a and a lightening hole 356b thereof forming the connection portion, and a cylindrical portion 356c whose inner diameter is larger than the outer diameter of the protrusion 355c of the side cover 340.

The molten resin for connecting the side cover 340 and the developing unit 220 is injected through the injection hole 355a of the side cover 340. The injected molten resin passes through the injection-flow passage 355b and reaches the downstream side opening 355d. Then, it forms a first connection portion 357a spreading in a disc-like fashion in a plane perpendicular to the injection-flow passage 355b. Thereafter, a second connection portion 357b is formed by molten resin flowing into a cylindrical gap formed between the inner periphery of a protrusion 355c and the outer periphery of a protrusion 356a. In this embodiment, the protrusion 356a is a protrusion with a circular section, and the protrusion 355c is a cylindrical protrusion with a diameter larger than that of the circular section of the protrusion 356a. As a result, the injected resin attains the state as shown in FIG. 19B, and the connection resin 357 of a configuration as shown in FIG. 19C forms the connecting portion partly filling the gap between the side cover 340 and the toner container 224 of the developing unit 220, with the side cover 340 and the developing unit 220 being secured in position while substantially maintaining the gaps W1 and W2.

In the above construction, the first connection portion 357a is formed as a disc, whereby the molten resin flows uniformly (in terms of the resin quantity, the resin speed, and reaching time of the resin) from the downstream side opening 355d. Further, in the second connection portion 357b also, the molten resin flows uniformly. Due to this arrangement, it is possible to effectively secure the requisite connection strength with a small amount of injected resin. Further, the lightening hole 356b is also filled with resin, whereby it is possible to increase the connection strength in the direction crossing the longitudinal direction of the photosensitive drum.

Further, by providing the cylindrical portion 356c, the molten resin is prevented from leaking to the exterior from the second connection portion 357b. Due to this arrangement, it is possible to maintain the requisite strength for the resin-connection portion 356.

The material of the two frame bodies connected, that is, the side cover 340 and the toner container 224, is high impact polystyrene (HIPS), and the injected resin is also HIPS. The material is not restricted to HIPS; by using a resin compatible with the resin of the frame bodies to be connected, it is possible to effectively perform the resin connection.

In this way, by resin connection, the side cover 340 and the developing unit 220 are secured in position while maintaining the longitudinal gaps W1 and W2 before the connection. That is, it is possible to firmly connect the drum unit 10 and the developing unit 220 without involving an increase in the driving load of the process cartridge or unevenness in rotation due to distortion and deformation of the side cover. Further, the number of screws to be required is reduced, and the connection process is simplified, whereby it is possible to contribute to a reduction in the production cost of an electrophotographic image forming apparatus.

What is claimed is:

1. A process cartridge detachable with respect to an electrophotographic image forming apparatus, comprising:
   an electrophotographic photosensitive drum;
   a first unit frame configured and positioned to support said electrophotographic photosensitive drum;
   a second unit frame comprising:
      a developing member configured and positioned to develop an electrostatic latent image formed on said electrophotographic photosensitive drum with a developer; and
      a developer-containing portion configured to contain the developer;
   a first connection frame configured and positioned to connect said first unit frame and said second unit frame at one end of said first unit frame and said second unit frame with respect to the axial direction of said electrophotographic photosensitive drum;
   a second connection frame configured and positioned to connect said first unit frame and said second unit frame at the other end of said first unit frame and said second unit frame with respect to the axial direction of said electrophotographic photosensitive drum;
   a first fixation member configured and positioned to fix said first connection frame with said first unit frame under a first condition in which said first connection frame abuts said first unit frame;
   a second fixation member configured and positioned to fix said first connection frame with said second unit frame under a second condition in which said first connection frame abuts said second unit frame;
   a third fixation member configured and positioned to fix said second connection frame to said first unit frame under a third condition in which said second connection frame abuts said first unit frame; and
   a fourth fixation member configured and positioned to fix said second connection frame and said second unit frame to each other by closing up a gap between said second connection frame and said second unit frame.

2. A process cartridge according to claim 1, wherein said fourth fixation member comprises a connection portion obtained by melting at least one of said second connection frame and said second unit frame.

3. A process cartridge according to claim 1, wherein said fourth fixation member comprises a connection portion obtained by passing a protrusion provided on said second unit frame through a hole provided in said second connection frame and melting the protrusion.

4. A process cartridge according to claim 3, wherein the hole has a tapered portion on the downstream side of said second connection frame with respect to a passing direction in which the protrusion is passed through the hole.

5. A process cartridge according to claim 1, wherein said fourth fixation member comprises a resin-connection portion to fix said second connection frame and said second unit frame to each other by injecting molten resin into the gap.

6. A process cartridge according to claim 1, wherein said second connection frame is equipped with an injection-flow passage configured and positioned to inject molten resin into the gap.

7. A process cartridge according to claim 5 or 6, wherein the gap has a cylindrical configuration with a bottom surface.

8. A process cartridge according to claim 6, wherein the outer diameter of the downstream side of the injection-flow passage is smaller than the outer diameter of the upstream side of the injection-flow passage with respect to the direction in which the molten resin is injected.

9. A process cartridge according to claim 1, wherein said second unit frame comprises:
   a movable developing frame configured and positioned to support said developing member; and
   a container frame forming said developer containing portion, and
   wherein said movable developing frame is retained so as to be movable with respect to said container frame.

10. A process cartridge which is detachable with respect to an electrophotographic image forming apparatus, comprising:
    an electrophotographic photosensitive drum;
    a first unit frame supporting said electrophotographic photosensitive drum;
    a developing unit comprising:
       a developing device configured and positioned to develop an electrostatic latent image formed on said electrophotographic photosensitive drum with a developer; and
       a developer-containing portion configured and positioned to contain the developer;
    a second unit frame supporting said developing unit;
    a first connection frame configured and positioned to connect said first unit frame and said second unit frame at one end of said first unit frame and said second unit frame with respect to an axial direction of said electrophotographic photosensitive drum;
    a second connection frame configured and positioned to connect said first unit frame and said second unit frame at the other end of said first unit frame and said second unit frame with respect to the axial direction of said electrophotographic photosensitive drum;
    a first fixation member configured and positioned to fix said first connection frame with said first unit frame under a first condition in which said first connection frame abuts said first unit frame;
    a second fixation member configured and positioned to fix said first connection frame with said second unit frame under a second condition in which said first connection frame abuts said second unit frame;
    a third fixation member configured and positioned to fix said second connection frame with said second unit frame under a third condition in which said second connection frame abuts said second unit frame; and
    a fourth fixation member configured and positioned to fix said second connection frame and said first unit frame to each other by closing up a gap between said second connection frame and said first unit frame.

11. A process cartridge according to claim 10, wherein said fourth fixation member comprises a connection portion obtained by melting at least one of said second connection frame and said first unit frame.

12. A process cartridge according to claim 10, wherein said fourth fixation member comprises a connection portion obtained by passing a protrusion provided on said first unit frame through a hole provided in said second connection frame and melting the protrusion.

13. A process cartridge according to claim 12, wherein the hole has a tapered portion on the downstream side of said second connection frame with respect to a passing direction in which the protrusion is passed through the hole.

14. A process cartridge according to claim 10, wherein said fourth fixation member comprises a resin connection portion to fix said second connection frame and said first unit frame to each other by injecting molten resin injected into the gap.

15. A process cartridge according to claim 10, wherein said second connection frame is equipped with an injection-flow passage configured and positioned to inject molten resin into the gap.

16. A process cartridge according to claim 14 or 15, wherein the gap has a cylindrical configuration with a bottom surface.

17. A process cartridge according to claim 15, wherein the outer diameter of the downstream side of the injection-flow passage is smaller than the outer diameter of the upstream side of the injection-flow passage with respect to the direction in which the molten resin is injected.

18. A process cartridge according to one of claim 3, 4, 12, and 13, wherein the hole has a recess extending in a direction crossing the passing direction in which the protrusion is passed through the hole.

19. An electrophotographic image forming apparatus for forming an image on a recording medium, comprising:
    an attachment member configured and positioned to detachably attach a process cartridge having an electrophotographic photosensitive drum, a first unit frame configured and positioned to support the electrophotographic photosensitive drum, a second unit frame having a developing member configured and positioned to develop an electrostatic latent image formed on the electrophotographic photosensitive drum with a developer and a developer-containing portion configured to contain the developer, a first connection frame configured and positioned to connect the first unit frame and the second unit frame at one end of the first unit frame and the second unit frame with respect to an axial direction of the electrophotographic photosensitive drum, a second connection frame configured and positioned to connect the first unit frame and the second unit frame at the other end of the first unit frame and the second unit frame with respect to the axial direction of the electrophotographic photosensitive drum, a first fixation member configured and positioned to fix the first connection frame with the first unit frame under a condition in which the first connection frame abuts said first unit frame, a second fixation member configured and positioned to fix the first connection frame with the second unit frame under a condition in which the first connection frame abuts the second unit frame, a third fixation member configured and positioned to fix the second connection frame with the first unit frame under a condition in which the second connection frame abuts the first unit frame, and a fourth fixation member configured and positioned to fix the second connection frame and the second unit frame to each other by closing up a gap between the second connection frame and the second unit frame;
    an image forming apparatus configured and positioned to form an image on the recording medium when said attachment member attaches the process cartridge to said electrophotographic image forming apparatus; and
    a transport member configured and positioned to transport the recording medium.

20. An electrophotographic image forming apparatus for forming an image on a recording medium, comprising:

an attachment member configured and positioned to detachably attach a process cartridge having an electrophotographic photosensitive drum, a first unit frame configured and positioned to support the electrophotographic photosensitive drum, a second unit frame having a developing member configured and positioned to develop an electrostatic latent image formed on the electrophotographic photosensitive drum with a developer and a developer-containing portion configured to contain the developer, a first connection frame configured and positioned to connect the first unit frame and the second unit frame at one end of the first unit frame and the second unit frame with respect to the axial direction of the electrophotographic photosensitive drum, a second connection frame configured and positioned to connect the first unit frame and the second unit frame at the other end of the first unit frame and the second unit frame with respect to the axial direction of the electrophotographic photosensitive drum, a first fixation member configured and positioned to fix the first connection frame with the first unit frame under a condition in which the first connection frame abuts the first unit frame, a second fixation member configured and positioned to fix the first connection frame with the second unit frame under a condition in which the first connection frame abuts the second unit frame, a third fixation member configured and positioned to fix the second connection frame with the second unit frame under a condition in which the second connection frame abuts the second unit frame, and a fourth fixation member configured and positioned to fix the second connection frame and the first unit frame to each other by closing up a gap between the second connection frame and the first unit frame;

an image forming apparatus configured and positioned to form an image on the recording medium when said attachment member attaches the process cartridge to said electrophotographic image forming apparatus; and a transport member configured and positioned to transport the recording medium.

21. A process cartridge according to claim 1, wherein under the first, second and third conditions, said abutting is effected along the axial direction of said electrophotographic photosensitive drum, and wherein the closing-up of the gap is effected along the axial direction of said electrophotographic photosensitive drum.

22. A process cartridge according to claim 10, wherein under the first, second and third conditions, said abutting is effected along the axial direction of the electrophotographic photosensitive drum, and wherein the closing-up of the gap is effected along the axial direction of said electrophotographic photosensitive drum.

* * * * *